US011829409B2

(12) United States Patent
Li

(10) Patent No.: US 11,829,409 B2
(45) Date of Patent: Nov. 28, 2023

(54) IMAGE PROCESSING SYSTEM, METHOD, AND APPARATUS

(71) Applicant: HUAWEI CLOUD COMPUTING TECHNOLOGIES CO., LTD., Guizhou (CN)

(72) Inventor: Mingdeng Li, Shenzhen (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 605 days.

(21) Appl. No.: 15/969,210

(22) Filed: May 2, 2018

(65) Prior Publication Data
US 2018/0253447 A1 Sep. 6, 2018

Related U.S. Application Data

(63) Continuation of application No. PCT/CN2016/080095, filed on Apr. 23, 2016.

(30) Foreign Application Priority Data

Nov. 24, 2015 (CN) .......................... 201510825073.9

(51) Int. Cl.
*G06F 16/58* (2019.01)
*G06F 16/51* (2019.01)
(Continued)

(52) U.S. Cl.
CPC .......... *G06F 16/5866* (2019.01); *G06F 13/10* (2013.01); *G06F 16/51* (2019.01);
(Continued)

(58) Field of Classification Search
CPC .... G06F 16/3344; G06F 40/42; G06F 16/683; G06F 40/58; G06F 16/243; G06F 16/955;
(Continued)

(56) References Cited

U.S. PATENT DOCUMENTS 6,003,093 A  12/1999 Kester
7,266,761 B2  9/2007 Levine et al.
(Continued)

FOREIGN PATENT DOCUMENTS

CN  1417680 A  5/2003
CN  105472197 A  4/2016
WO  2005059704 A3  6/2005

OTHER PUBLICATIONS

Machine Translation and Abstract of Chinese Publication No. CN1417680, May 14, 2003, 2 pages.
(Continued)

*Primary Examiner* — Angelica Ruiz
(74) *Attorney, Agent, or Firm* — Conley Rose, P.C.

(57) ABSTRACT

An image processing system, method, and apparatus are provided and pertain to the field of information technologies. The method includes receiving an image processing instruction sent by a data source manager, the image processing instruction triggered by an application client and instructing to process an image obtained by an image input device corresponding to a general-purpose data source; processing, according to the image processing instruction, the image obtained by the image input device; and sending a processing result to the data source manager. According to the application, the general-purpose data source processes the image obtained by the image input device, thereby avoiding a problem that the image obtained by the image input device cannot be processed because the image input device does not provide a data source.

20 Claims, 13 Drawing Sheets

(51) Int. Cl.
*H04N 1/00* (2006.01)
*G06F 13/10* (2006.01)

(52) U.S. Cl.
CPC ........... *H04N 1/00* (2013.01); *H04N 1/00127* (2013.01); *H04N 1/00244* (2013.01); *H04N 1/00973* (2013.01)

(58) Field of Classification Search
CPC ........... G06F 2221/0733; G06F 16/583; G06F 3/1292; G06F 3/1247; G06F 3/128
USPC ........... 707/600–831, 899, 999.001–999.206
See application file for complete search history.

(56) References Cited

U.S. PATENT DOCUMENTS

| | | | |
|---|---|---|---|
| 7,837,094 B2* | 11/2010 | Rhoads | B42D 25/23 235/375 |
| 2001/0025326 A1* | 9/2001 | Kizaki | H04N 1/00326 710/100 |
| 2002/0126147 A1* | 9/2002 | Lavendel | H04N 1/00241 715/764 |
| 2006/0015569 A1 | 1/2006 | Rhodus et al. | |
| 2006/0069815 A1* | 3/2006 | Warner, III | H04N 1/00222 710/10 |
| 2006/0070090 A1* | 3/2006 | Gulkis | H04N 1/00236 719/328 |
| 2009/0015862 A1* | 1/2009 | Kim | H04N 1/00204 358/1.15 |
| 2011/0304740 A1* | 12/2011 | Crucs | G06F 16/51 348/222.1 |
| 2015/0073697 A1* | 3/2015 | Barrett | G01S 19/426 701/409 |
| 2015/0237106 A1* | 8/2015 | Golay | H04L 67/02 709/203 |
| 2018/0114190 A1* | 4/2018 | Borrel | G06N 20/00 |

OTHER PUBLICATIONS

Machine Translation and Abstract of Chinese Publication No. CN105472197, Apr. 6, 2016, 13 pages.
"Scanning Images from a TWAIN-compliant Device," Baidu Bunko, May 6, 2015, 14 pages.
English Translation of "Scanning Images from a TWAIN-compliant Device," Baidu Bunko, May 6, 2015, 4 pages.
"TWAIN Interface Specification and Application," Baidu Bunko, Jun. 9, 2011, 9 pages.
English Translation of "TWAIN Interface Specification and Application," Baidu Bunko, Jun. 9, 2011, 5 pages.
Foreign Communication From A Counterpart Application, Chinese Application No. 201510825073.9, Chinese Office Action dated Nov. 29, 2017, 8 pages.
Foreign Communication From A Counterpart Application, PCT Application No. PCT/CN2016/080095, English Translation of International Search Report dated Aug. 22, 2016, 3 pages.
"TWAIN Specification Version 2.1," XP008171265, Part 1, Internet Citation, Jul. 8, 2009, 420 pages.
"TWAIN Specification Version 2.1," XP008171265, Part 2, Internet Citation, Jul. 8, 2009, 328 pages.
Foreign Communication From A Counterpart Application, European Application No. 16867578.3, Extended European Search Report dated Aug. 29, 2018, 9 pages.

* cited by examiner

IMAGE PROCESSING SYSTEM, METHOD, AND APPARATUS

CROSS-REFERENCE TO RELATED APPLICATION

This application is a continuation of International Application No. PCT/CN2016/080095, filed on Apr. 23, 2016, which claims priority to Chinese Patent Application No. 201510825073.9, filed on Nov. 24, 2015, both of which are hereby incorporated by reference in their entireties.

TECHNICAL FIELD

This application relates to the field of information technologies, and in particular, to an image processing system, method, and apparatus.

BACKGROUND

Development of information technologies promotes wide application of image input devices. An image input device can convert conventional paper data and the like into electronic images such that data processing efficiency is significantly improved.

When an application client needs to obtain an image from an image input device, the application client may invoke a first interface between the application client and a data source manager, and start the data source manager. Then, the data source manager loads a data source provided by the image input device in a specified directory, invokes a second interface between the data source manager and the data source, and starts the data source. The data source may instruct the image input device to obtain the image, and return the obtained image to the application client using the second interface and the first interface.

In a process of implementing the application, the inventor finds that the other approaches have at least the following problem.

An image obtained by an image input device can be obtained only using a data source provided by the image input device. When the image input device does not provide a data source, the image cannot be obtained, causing a great limitation.

SUMMARY

To the problem, this application provides an image processing system, method, and apparatus. The technical solutions are as follows.

According to one aspect, an embodiment of this application provides an image processing system, and the system includes an application client, a data source manager, a general-purpose data source, and at least one image input device corresponding to the general-purpose data source.

The general-purpose data source is applicable to image input devices of different types. When an image obtained by the image input device is processed, the application client sends an image processing instruction for the general-purpose data source to the data source manager, and the data source manager sends the image processing instruction to the general-purpose data source. The general-purpose data source may process, according to the image processing instruction, an image that is obtained by an image input device specified by the image processing instruction, and return a processing result to the application client using the data source manager.

In a possible design, the general-purpose data source is oriented to the at least one image input device, may obtain a device identifier of the at least one image input device, and may further determine a specified device identifier from at least one device identifier according to the image processing instruction in order to process an image that is obtained by an image input device indicated by the specified device identifier.

In a possible design, the system further includes a general-purpose device manager. The general-purpose device manager can generate a general-purpose data source for the image input device, and establish a mapping relationship between a device identifier of the image input device and the general-purpose data source.

In a possible design, the system includes a terminal and a server. A TWAIN (toolkit without an interesting name) server is installed on the server, a TWAIN client is installed in the terminal, and the TWAIN server is in communication connection with the TWAIN client. The application client is located on the server, and the data source manager, the general-purpose device manager, and the general-purpose data source are located in the terminal.

In addition, for a layout of the data source manager, the general-purpose device manager, and the general-purpose data source, any combination of the data source manager, the general-purpose device manager, and the general-purpose data source may be built in the TWAIN client, and any one of the data source manager, the general-purpose device manager, or the general-purpose data source that is not in the combination may be external to the TWAIN client. For example, the data source manager, the general-purpose device manager, and the general-purpose data source may be external to the TWAIN client; or the data source manager and the general-purpose data source are external to the TWAIN client, and the general-purpose device manager is built in the TWAIN client; or the data source manager, the general-purpose device manager, and the general-purpose data source are built in the TWAIN client; or the general-purpose data source is external to the TWAIN client, and the data source manager and the general-purpose device manager are built in the TWAIN client.

According to another aspect, an embodiment of this application provides an image processing method. In the method, an application client triggers an image processing instruction, and sends the image processing instruction to a data source manager. The image processing instruction is used to instruct to process an image that is obtained by an image input device corresponding to a general-purpose data source. After receiving the image processing instruction, the data source manager processes the image obtained by the image input device, and returns a processing result.

In a possible design, a general-purpose device manager generates the general-purpose data source, and establishes a mapping relationship between the general-purpose data source and a device identifier of the image input device, to determine the image input device corresponding to the general-purpose data source such that the general-purpose data source can process the image obtained by the corresponding image input device.

In addition, when the general-purpose data source sends a query request to the general-purpose device manager, the general-purpose device manager may query, according to the established mapping relationship, the device identifier corresponding to the general-purpose data source.

In a possible design, the general-purpose device manager presets a general-purpose data source. After traversing a device identifier of at least one currently configured image input device, the general-purpose device manager generates, according to the preset general-purpose data source, at least one general-purpose data source that is the same as the preset general-purpose data source. Then, the general-purpose device manager establishes a mapping relationship between a device identifier of each image input device and a corresponding general-purpose data source.

In a possible design, the general-purpose device manager copies the preset general-purpose data source multiple times according to a quantity of image input devices currently configured in the terminal, to obtain the at least one general-purpose data source, and then establishes the mapping relationship between the device identifier of each image input device and the corresponding general-purpose data source.

In a possible design, the general-purpose data source is oriented to the at least one image input device, may obtain a device identifier of the at least one image input device, and may further determine a specified device identifier from at least one device identifier according to the image processing instruction in order to process an image that is obtained by an image input device indicated by the specified device identifier.

In a possible design, the general-purpose data source may determine the specified device identifier from the at least one device identifier, and may further switch the specified device identifier. For example, when a first device identifier is the specified device identifier, a second device identifier is switched to the specified device identifier.

In a possible design, when establishing a general-purpose data source, the general-purpose device manager may generate one general-purpose data source for each image input device, or different image input devices share a general-purpose data source.

In a possible design, when the general-purpose data source sends the query request, the general-purpose device manager may query, according to the established mapping relationship, the device identifier corresponding to the general-purpose data source.

According to still another aspect, an embodiment of this application further provides a general-purpose data source that performs the foregoing image processing method, and provides a terminal that implements the general-purpose data source such that the general-purpose data source can perform the foregoing provided image processing method.

According to yet another aspect, an embodiment of this application further provides a general-purpose device manager that performs the foregoing image processing method, and provides a terminal that implements the general-purpose device manager such that the general-purpose device manager can perform the foregoing provided image processing method.

The technical solutions provided in this application bring the following beneficial effects. The general-purpose data source is introduced, and the general-purpose data source processes the image obtained by the image input device. When receiving the image processing instruction sent by the data source manager, the general-purpose data source processes, according to the image processing instruction, the image obtained by the image input device, and sends the processing result to the data source manager. In this way, a problem is avoided that the image obtained by the image input device cannot be processed because the image input device does not provide a data source, and flexibility is improved.

BRIEF DESCRIPTION OF DRAWINGS

To describe the technical solutions in the embodiments of the application more clearly, the following briefly describes the accompanying drawings required for describing the embodiments. The accompanying drawings in the following description show merely some embodiments of the application, and a person of ordinary skill in the art may still derive other drawings from these accompanying drawings without creative efforts.

FIG. 9B-1 and FIG. 9B-2 are a schematic diagram of an image processing operation procedure according to an embodiment of the application;

DESCRIPTION OF EMBODIMENTS

Figure 1:
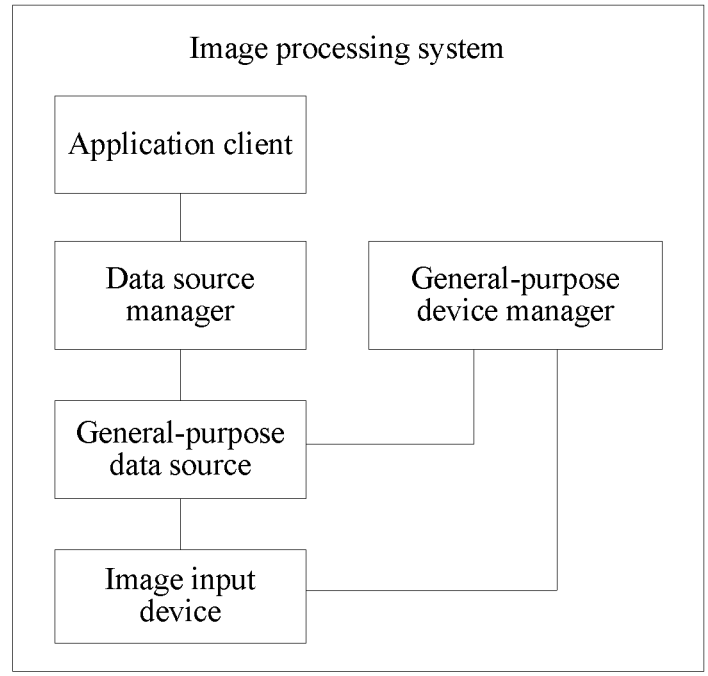
FIG. 1 is a schematic structural diagram of an image processing system according to an embodiment of the application.

The following describes the technical solutions in the embodiments of the application with reference to the accompanying drawings in the embodiments of the application. The described embodiments are merely a part rather than all of the embodiments of the application. All other embodiments obtained by a person of ordinary skill in the art based on the embodiments of the application shall fall within the protection scope of the application.

To facilitate understanding of the application, concepts in the embodiments of the application are explained as follows.

A general-purpose device manager is configured to obtain, by means of traversal, an image input device configured in a terminal; generate a corresponding general-purpose data source for the image input device configured in the terminal; maintain a mapping relationship between the image input device and the general-purpose data source; and wait for the general-purpose data source to query the image input device corresponding to the general-purpose data source. In addition, the general-purpose device manager is further configured to monitor a removal/insertion status of the image input device, and delete, in a timely manner, a general-purpose data source corresponding to a removed image input device.

A data source manager is responsible for negotiating interaction between an application client and a general-purpose data source, and serves as a bridge for interactive data transfer between the application client and the general-purpose data source.

A general-purpose data source is applicable to multiple types of image input devices, and may be loaded and identified by a data source manager. The general-purpose data source interacts with an application client using the data source manager, and can actively query a corresponding image input device from a general-purpose device manager. In addition, the general-purpose data source invokes an interface between the general-purpose data source and the image input device to implement necessary functions such as turning on a video device, setting a video parameter, setting a collection manner, obtaining image data, and turning off a video device, and may further implement richer functions such as real-time video image preview, simple image processing, and user screen parameter storage.

An existing data source is provided by an image input device, and is applicable only to a particular image input device. However, the general-purpose data source in the embodiments of the application may be compatible with multiple types of image input devices. Therefore, even though an image input device does not provide a data source, the general-purpose data source can be used to process an image obtained by the image input device.

A TWAIN client and a TWAIN server establish a virtual path, and communicate with each other using the virtual path. A general-purpose device manager may be built in the TWAIN client. Therefore, the TWAIN client has a function of the general-purpose device manager, and can enumerate an image input device configured in a terminal, obtain a device identifier of each image input device and related information about the image input device, generate a corresponding general-purpose data source for the image input device, maintain a mapping relationship between the image input device and the general-purpose data source, and wait for the general-purpose data source to query the image input device corresponding to the general-purpose data source. In addition, a data source manager may be built in the TWAIN client. Therefore, the TWAIN client implements a function of the data source manager, and can manage the general-purpose data source; and is responsible for negotiating interaction between an application client and the general-purpose data source.

FIG. 1 is a schematic structural diagram of an image processing system according to an embodiment of the application. Referring to FIG. 1, the image processing system includes an application client, a data source manager, a general-purpose data source, and at least one image input device corresponding to the general-purpose data source.

The application client is configured to send an image processing instruction for the general-purpose data source to the data source manager.

The data source manager is configured to, when receiving the image processing instruction, send the image processing instruction to the general-purpose data source.

The general-purpose data source is configured to, when receiving the image processing instruction, process, according to the image processing instruction, an image that is obtained by an image input device specified by the image processing instruction; and send a processing result to the data source manager.

The data source manager is further configured to, when receiving the processing result, send the processing result to the application client.

According to the system provided in this embodiment of the application, the application client sends the image processing instruction for the general-purpose data source to the data source manager. The data source manager receives the image processing instruction, and sends the image processing instruction to the general-purpose data source. The general-purpose data source receives the image processing instruction, processes, according to the image processing instruction, the image obtained by the image input device, and sends the processing result to the data source manager. When receiving the processing result returned by the general-purpose data source, the data source manager sends the processing result to the application client. The application client receives the processing result. According to the technical solution used in the application, the general-purpose data source corresponding to the image input device is generated in advance, and the general-purpose data source may be configured to process the image obtained by the image input device. In this way, a problem is avoided that the image obtained by the image input device cannot be processed because the image input device does not provide a data source, and flexibility is improved.

Optionally, the general-purpose data source is further configured to determine, according to the image processing instruction, a specified device identifier from a device identifier of the at least one image input device; and process an image that is obtained by an image input device indicated by the specified device identifier.

Optionally, the system further includes a general-purpose device manager. The general-purpose device manager is configured to obtain a device identifier of the image input device, generate a general-purpose data source according to the device identifier of the image input device, and establish a mapping relationship between the device identifier and the generated general-purpose data source.

Figure 2:
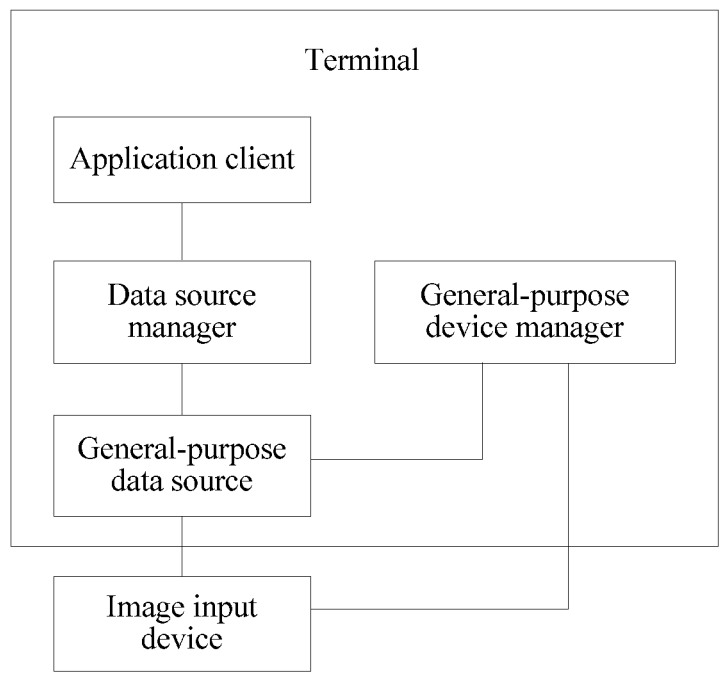
FIG. 2 is a schematic structural diagram of an image processing system according to an embodiment of the application.

Optionally, referring to FIG. 2, the system may be further configured in a terminal. The application client, the data source manager, the general-purpose data source, and the general-purpose device manager are located in the terminal.

The image input device may be external to the terminal, and may be connected to the terminal using a protocol such as a universal serial bus (USB) protocol or a serial peripheral interface (SPI) protocol. For example, the image input device may be a scanner or a high-speed document scanner connected to the terminal. Alternatively, the image input device may be built in the terminal. For example, the image input device may be an album configured in the terminal. This is not limited in this embodiment of the application.

Optionally, the system may further include a terminal and a server. Correspondingly, the application client, the data source manager, the general-purpose data source, and the general-purpose device manager may be configured in the following manners.

Figure 3:
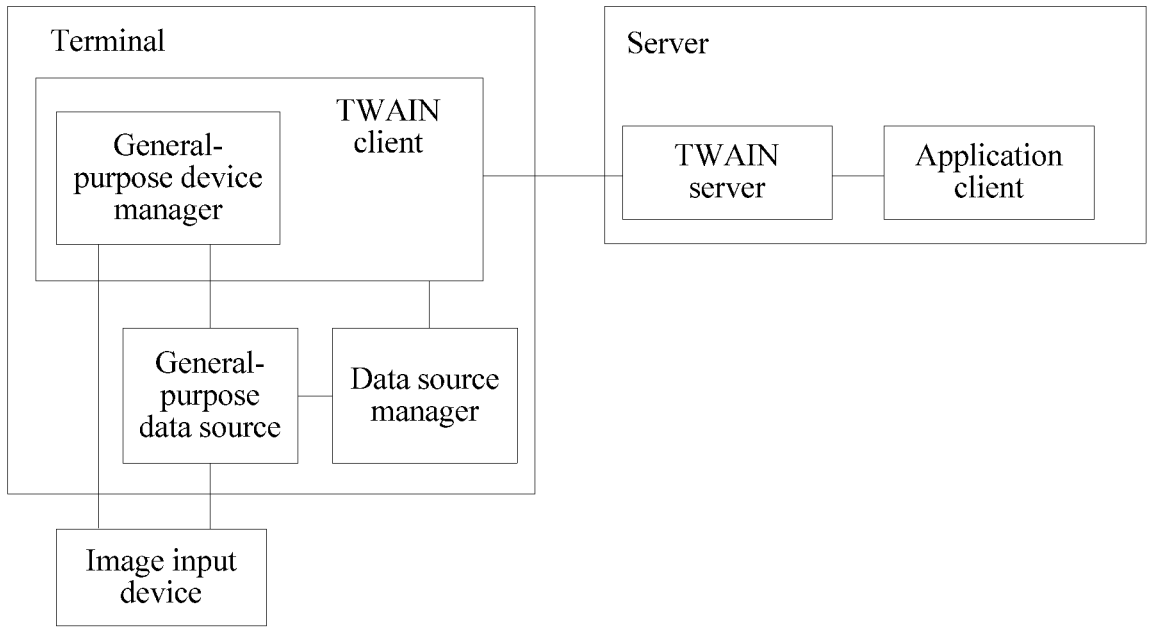
FIG. 3 is a schematic structural diagram of an image processing system according to an embodiment of the application.

1. Referring to FIG. 3, the application client is located on the server, and the data source manager and the general-purpose data source are located in the terminal; a TWAIN server is installed on the server, a TWAIN client is installed in the terminal, and the TWAIN server is in communication connection with the TWAIN client; and the data source manager and the general-purpose data source are external to the TWAIN client, and the general-purpose device manager is built in the TWAIN client.

Figure 4:
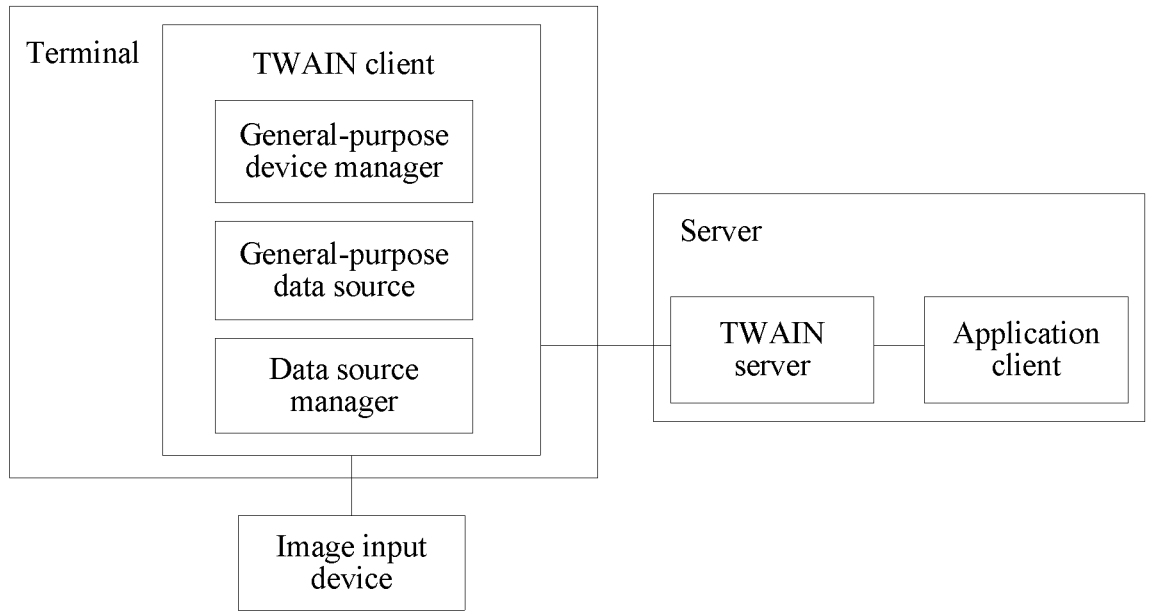
FIG. 4 is a schematic structural diagram of an image processing system according to an embodiment of the application.

2. Referring to FIG. 4, the application client is located on the server; a TWAIN server is installed on the server, a TWAIN client is installed in the terminal, and the TWAIN server is in communication connection with the TWAIN client; and the data source manager, the general-purpose device manager, and the general-purpose data source are built in the TWAIN client.

Figure 5:
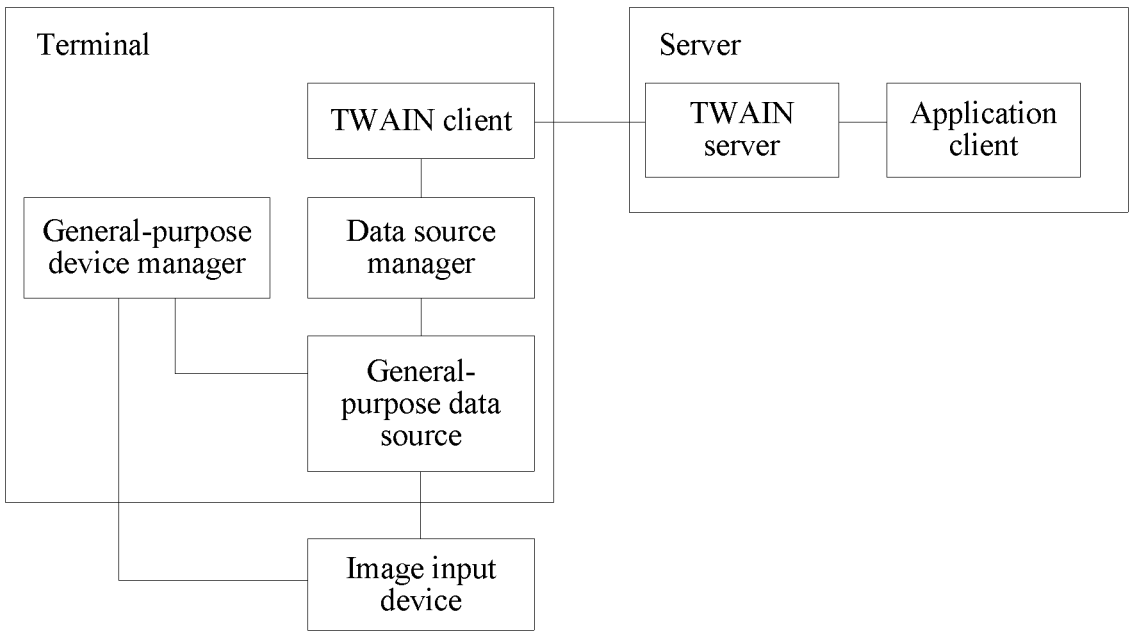
FIG. 5 is a schematic structural diagram of an image processing system according to an embodiment of the application.

3. Referring to FIG. 5, the application client is located on the server, and the data source manager, the general-purpose device manager, and the general-purpose data source are located in the terminal; a TWAIN server is installed on the server, a TWAIN client is installed in the terminal, and the TWAIN server is in communication connection with the TWAIN client; and the data source manager, the general-purpose device manager, and the general-purpose data source are external to the TWAIN client.

Figure 6:
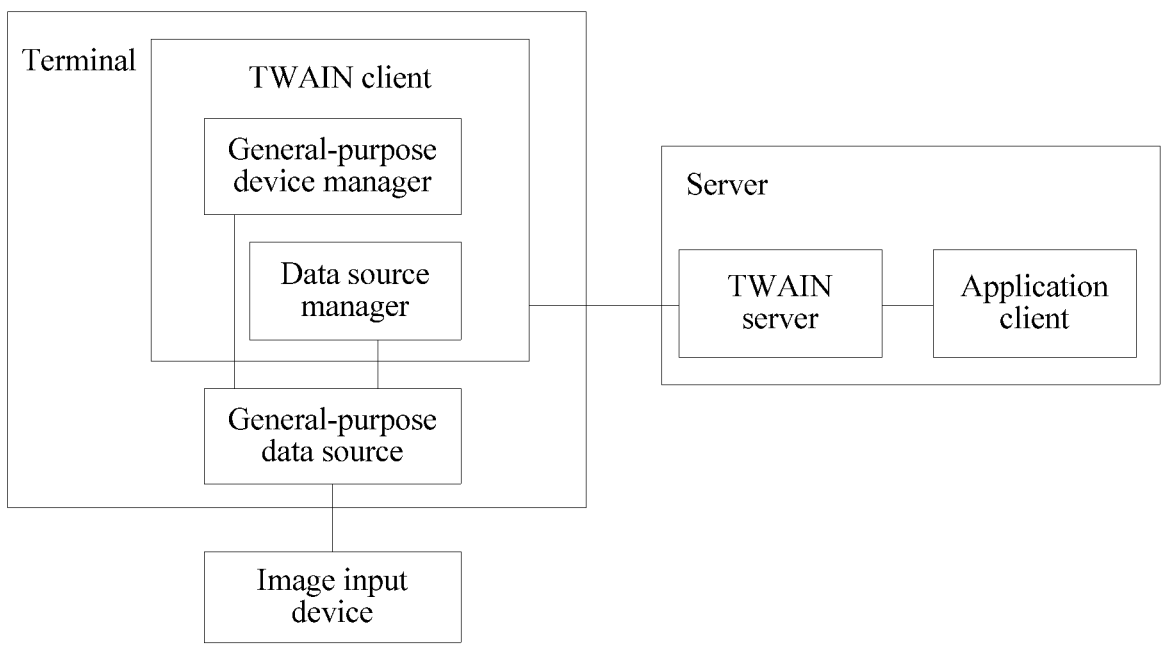
FIG. 6 is a schematic structural diagram of an image processing system according to an embodiment of the application.

4. Referring to FIG. 6, the application client is located on the server; a TWAIN server is installed on the server, a TWAIN client is installed in the terminal, and the TWAIN server is in communication connection with the TWAIN client; and the general-purpose data source is external to the TWAIN client, and the data source manager and the general-purpose device manager are built in the TWAIN client.

Image processing systems in FIG. 3 to FIG. 6 may be remote virtual desktop systems. In the remote virtual desktop system, the server includes the application client and the TWAIN server, and the terminal includes the TWAIN client and the general-purpose data source. In the remote virtual desktop system, the general-purpose data source in the terminal is mapped to the server using the TWAIN server and the TWAIN client, and this is equivalent to a virtual general-purpose data source on the server in order to process an image in the remote virtual desktop system.

The server may be one server or multiple servers in a server cluster. The application client may be located on one server or different servers in the server cluster.

All the foregoing optional technical solutions may be randomly combined to obtain optional embodiments of the application. Details are not described herein.

Figure 7:
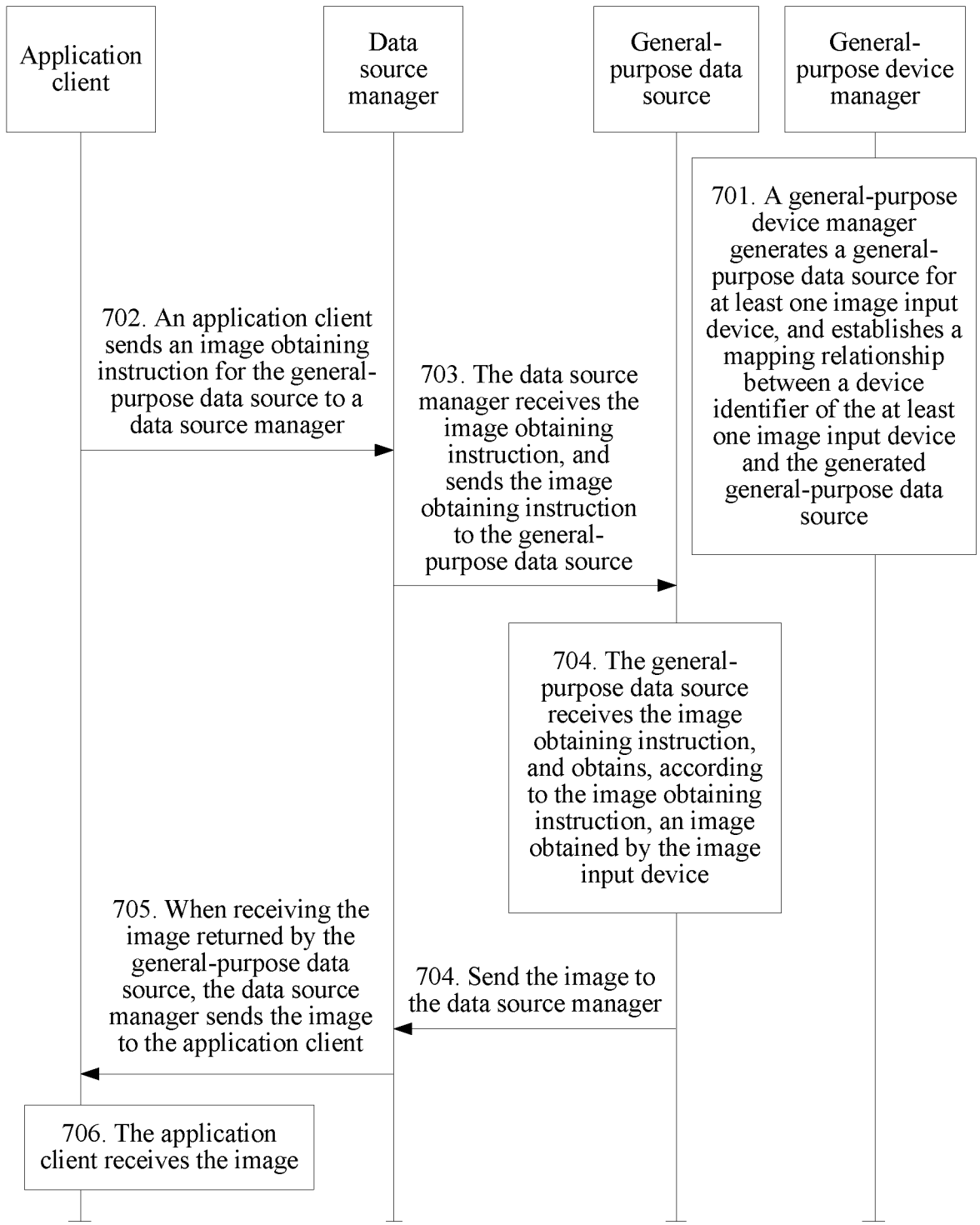
FIG. 7 is a flowchart of an image processing method according to an embodiment of the application.

FIG. 7 is a flowchart of an image processing method according to an embodiment of the application. This embodiment of the application is applied to the image processing system shown in FIG. 2, and is executed by an application client, a data source manager, a general-purpose device manager, and a general-purpose data source. Referring to FIG. 7, the method includes the following steps.

701. The general-purpose device manager generates a general-purpose data source for at least one image input device, and establishes a mapping relationship between a device identifier of the at least one image input device and the generated general-purpose data source such that the general-purpose data source processes an image obtained by a corresponding image input device.

Further, a process of establishing the mapping relationship may include the following step (1) or (2).

(1) The general-purpose device manager generates one general-purpose data source for each of the at least one image input device, and establishes a mapping relationship between a device identifier of each image input device and a general-purpose data source generated for the corresponding image input device.

The device identifier of the image input device is used to uniquely determine the image input device, and may be a device sequence number, a device name, or the like of the image input device. This is not limited in this embodiment.

Further, the general-purpose device manager presets a general-purpose data source, and after traversing a device identifier of at least one image input device currently configured in the terminal, generates, according to the preset general-purpose data source, at least one general-purpose data source that is the same as the preset general-purpose data source. Then, the general-purpose device manager establishes a mapping relationship between a device identifier of each image input device and a corresponding general-purpose data source.

Optionally, the general-purpose device manager may copy the preset general-purpose data source multiple times according to a quantity of image input devices currently configured in the terminal, to obtain the at least one general-purpose data source, and then establish the mapping relationship.

When the at least one general-purpose data source is generated, to distinguish different general-purpose data sources, the at least one general-purpose data source may be named according to a device identifier of an image input device and a preset rule such that a name of the at least one general-purpose data source includes a device identifier of a corresponding image input device, and names of all general-purpose data sources are different. Alternatively, a general-purpose data source may be generated in different file directories. In this case, names of general-purpose data sources in the different file directories may be the same, or may be different. This is not limited in this embodiment of the application.

In addition, after the at least one general-purpose data source is generated, the at least one general-purpose data source may be stored in a specified directory such that the data source manager can load the general-purpose data source in the specified directory, and start the general-purpose data source. The specified directory may be determined by the data source manager. This is not limited in this embodiment of the application.

For example, the general-purpose device manager obtains device identifiers of three image input devices, and the device identifiers of the three image input devices are a video 1, a video 2, and a video 3. In a specified directory/user/local/lib/twain, three same general-purpose data sources are generated according to a preset general-purpose data source hw_video.ds, and the three general-purpose data sources are respectively named as hw_video_1.ds, hw_video_2.ds, and hw_video_3.ds. An established mapping relationship between a device identifier of each image input device and a corresponding general-purpose data source is shown in Table 1 below.

TABLE 1

| Device identifier | General-purpose data source |
|---|---|
| video1 | hw_video_1.ds |
| video2 | hw_video_2.ds |
| video3 | hw_video_3.ds |

(2) The general-purpose device manager traverses a device identifier of at least one image input device currently configured in the terminal, generates one general-purpose data source for multiple image input devices in the at least one image input device, and establishes a mapping relationship between a device identifier of each image input device and a general-purpose data source generated for the corresponding image input device. The multiple image input devices share the general-purpose data source.

A preset quantity may be determined by the general-purpose device manager, or may be pre-determined by the terminal. This is not limited in this embodiment.

A process of generating the general-purpose data source and establishing the mapping relationship in step (2) is similar to that in step (1). Details are not described herein again. A difference between step (1) and step (2) lies in that one general-purpose data source is generated for each image input device using a ratio of 1:1 in step (1), but one general-purpose data source is generated for M image input devices using a ratio of M:1 (M represents a quantity of image input devices that share the general-purpose data source) in step (2). The multiple image input devices share the general-purpose data source.

Because a general-purpose data source may perform processing only for one image input device each time, when multiple image input devices share the general-purpose data source, the general-purpose data source may determine a specified image input device in the multiple image input devices, that is, determine a default image input device in order to subsequently process an image obtained by the specified image input device.

In a subsequent process, the general-purpose data source may further switch the specified image input device. Further, the general-purpose data source may first use a first device identifier as a specified device identifier, to indicate that an image input device indicated by the first device identifier is the specified image input device. The general-purpose data source may further provide a display screen on the terminal, and provide, on the display screen, a switch function for an image input device. When a user triggers the switch function and selects a second device identifier, the general-purpose data source determines that an instruction of switching an image input device is received, determines, as the second device identifier, a device identifier that is indicated by the instruction of switching an image input device, and uses the second device identifier as the specified device identifier, instead of determining the first device identifier as the specified device identifier. Therefore, it is determined that an image input device indicated by the second device identifier is a currently specified image input device of the general-purpose data source. The display screen may be a dialog box, a pop-up operation window, or the like. This is not limited in this embodiment of the application.

It should be noted that when the terminal deletes a locally configured image input device, or is disconnected from an image input device, the general-purpose device manager may delete a mapping relationship between the image input device and a device identifier of a general-purpose data source. In addition, when independently generating a general-purpose data source for the image input device, the general-purpose device manager may further delete the general-purpose data source.

In addition, the terminal may further generate one general-purpose data source for all image input devices according to a ratio of M:1 (M represents a total quantity of image input devices). The M image input devices may share the general-purpose data source. In this case, the general-purpose device manager does not need to be configured in the terminal, and only one general-purpose data source needs to be generated. The general-purpose data source may traverse currently configured image input devices, and a mapping relationship between the general-purpose data source and a device identifier of each image input device may be established.

That is, the general-purpose data source is introduced in this embodiment of the application, and the general-purpose data source processes an image obtained by an image input device. If only one general-purpose data source is introduced, multiple image input devices share the general-purpose data source, and the general-purpose device manager does not need to be introduced; or if multiple general-purpose data sources are introduced, the general-purpose device manager needs to be introduced, and the general-purpose device manager generates the multiple general-purpose data sources, and establishes a mapping relationship between each general-purpose data source and a device identifier of an image input device.

702. The application client sends an image obtaining instruction for the general-purpose data source to the data source manager.

In this embodiment of the application, the application client and the data source manager are configured in the terminal. An image input device may be further configured in the terminal. The user may process, using the application client, an image obtained by the image input device.

The application client may be a chat application client, a browser application client, an album management application client, or the like. This is not limited in this embodiment of the application. The image input device may obtain an image, and provide the obtained image for the application client. The image input device may be a device of a particular type. The device of a particular type may be, for example, a video device or a device of another type. In addition, the image input device may be a scanner, a high-speed document scanner, or the like connected to the terminal, or may be an album inside the terminal. This is not limited in this embodiment of the application.

To help manage an image input device that does not provide a data source, the general-purpose device manager and the general-purpose data source may be further configured in the terminal. That is, before step 701, the method further includes configuring the general-purpose device manager in the terminal; and when the terminal is connected to the image input device, generating, by the general-purpose device manager, a general-purpose data source corresponding to the image input device. The general-purpose data source is configured to process an image obtained by the image input device, and the data source manager is configured to manage the general-purpose data source.

The general-purpose device manager may be an executable program or in an executable type, or the like. For example, the general-purpose device manager may be an executable program or a daemon process used for a system service, or in a CTwainVideoManager type in a TWAIN client. The general-purpose data source may be a dynamic library or in a dynamic type with an extension ds, for example, may be a data source file hw_video.ds that meets the TWAIN protocol specification, or may be in a CTwainVideo type in the TWAIN client. In addition, when the general-purpose data source is the dynamic library with the extension ds, the general-purpose data source may be stored in a specified directory of the TWAIN client. This is not limited in this embodiment of the application.

In addition, the application client interacts with the data source manager using a first interface, and the first interface may be a DSM_Entry interface, or the like. The data source manager interacts with the general-purpose data source using a second interface, and the second interface may be a DS_Entry interface, or the like. The general-purpose data source interacts with the image input device using a third interface, and the third interface may be a DirectShow interface, a V4L2 (Video 4 Linux 2) interface, or the like. This is not limited in this embodiment of the application.

Further, the first interface and the second interface may be interfaces based on the TWAIN protocol. The application client supports the TWAIN protocol, and may be Photoshop, or the like. This is not limited in this embodiment of the application.

In this embodiment of the application, to obtain the image obtained by the image input device, the application client sends the image obtaining instruction for the image input device to the data source manager. The image obtaining instruction is used to obtain the image obtained by the image input device corresponding to the general-purpose data source.

Further, the application client displays general-purpose data sources that correspond to all image input devices currently configured in the terminal. The user may select any general-purpose data source in the application client. The general-purpose data source may display an image obtained by a corresponding image input device, and the user may trigger an operation of obtaining any image. When detecting an operation of obtaining the image, the application client sends the image obtaining instruction to the data source manager by invoking the first interface, to instruct the data source manager to obtain the image.

703. The data source manager receives the image obtaining instruction, and sends the image obtaining instruction to the general-purpose data source.

When receiving the image obtaining instruction, the data source manager may send the image obtaining instruction to the general-purpose data source by invoking the second interface between the data source manager and the general-purpose data source such that the general-purpose data source obtains the image from the corresponding image input device.

704. The general-purpose data source receives the image obtaining instruction, obtains, according to the image obtaining instruction, the image obtained by the image input device, and sends the image to the data source manager.

When receiving the image obtaining instruction, the general-purpose data source may determine, according to the image obtaining instruction, a specified device identifier from multiple device identifiers corresponding to the general-purpose data source, and obtain, by invoking the third interface between the general-purpose data source and the specified device identifier, an image that is obtained by an image input device indicated by the specified device identifier. Then, the general-purpose data source sends the image to the data source manager by invoking the second interface.

To determine at least one device identifier corresponding to the general-purpose data source, before step 704, the method further includes sending, by the general-purpose data source, a query request to the general-purpose device manager; receiving, by the general-purpose device manager, the query request, querying, according to the established mapping relationship between the device identifier of the image input device and the general-purpose data source, a device identifier of at least one image input device corresponding to the general-purpose data source, and sending the at least one device identifier to the general-purpose data source; and receiving, by the general-purpose data source, the at least one device identifier in order to obtain an image that is obtained by an image input device corresponding to the at least one device identifier.

It should be noted that, in the mapping relationship established by the general-purpose device manager, a general-purpose data source identifier is used to indicate the general-purpose data source, and the general-purpose data source may obtain the general-purpose data source identifier, and send a query request to the general-purpose device manager. The query request includes the general-purpose data source identifier. When receiving the query request, the general-purpose device manager may query, according to the general-purpose data source identifier, a device identifier of at least one image input device corresponding to the general-purpose data source identifier. The general-purpose data source identifier may be a name of the general-purpose data source, a sequence number included in the name, and the like. This is not limited in this embodiment of the application.

705. When receiving the image returned by the general-purpose data source, the data source manager sends the image to the application client.

706. The application client receives the image.

When receiving the image, the data source manager sends the image to the application client by invoking the first interface. After receiving the image, the application client may display or store the image.

In this embodiment of the application, an example in which the application client obtains the image obtained by the image input device is used merely for description. In an exemplary application process, after the application client selects a general-purpose data source, before the application client obtains an image using the general-purpose data source, the to-be-obtained image may be further processed.

Optionally, the image obtained by the image input device may be processed in either of the following manners.

1. The general-purpose data source queries a capability of the image input device, and provides multiple image setting options on the provided display screen according to the capability of the image input device. When the user expects to process the image obtained by the image input device, the user may tap any image setting option on the display screen, and specify an image parameter corresponding to the image setting option. The general-purpose data source may process, according to the image parameter specified by the user, the image obtained by the image input device, to obtain an image that matches the image parameter.

The multiple image setting options may include an image preview option, an image obtaining option, an image cropping option, a color adjustment option, a luminance adjustment option, and the like. The image parameter may include a size parameter, a color parameter, a luminance parameter, and the like of the image. This is not limited in this embodiment of the application. The user may implement multiple processing operations such as image preview, image obtaining, image cropping, color adjustment, and luminance adjustment using the image setting options. This is not limited in this embodiment of the application.

2. The application client may display multiple image setting options on the provided display screen. When the user expects to obtain an image, the user may first set a to-be-obtained image using the multiple displayed image setting options. The application client determines, according to an operation performed on the image setting options by the user, an image parameter specified by the user, and sends the image parameter to the general-purpose data source according to the TWAIN protocol. Subsequently, when obtaining the image obtained by the image input device, the general-purpose data source may process the to-be-obtained image according to the specified image parameter, to obtain an image that matches the image parameter.

According to the method provided in this embodiment of the application, the general-purpose data source is introduced, and the general-purpose data source obtains the image obtained by the image input device. When receiving the image obtaining instruction sent by the data source manager, the general-purpose data source obtains, according to the image obtaining instruction, the image obtained by the image input device, performs setting according to the image setting option to perform particular processing on the image, and sends the processed image to the data source manager. In this way, a problem is avoided that the image obtained by the image input device cannot be obtained because the image input device does not provide a data source, and flexibility is improved.

Figure 8A:
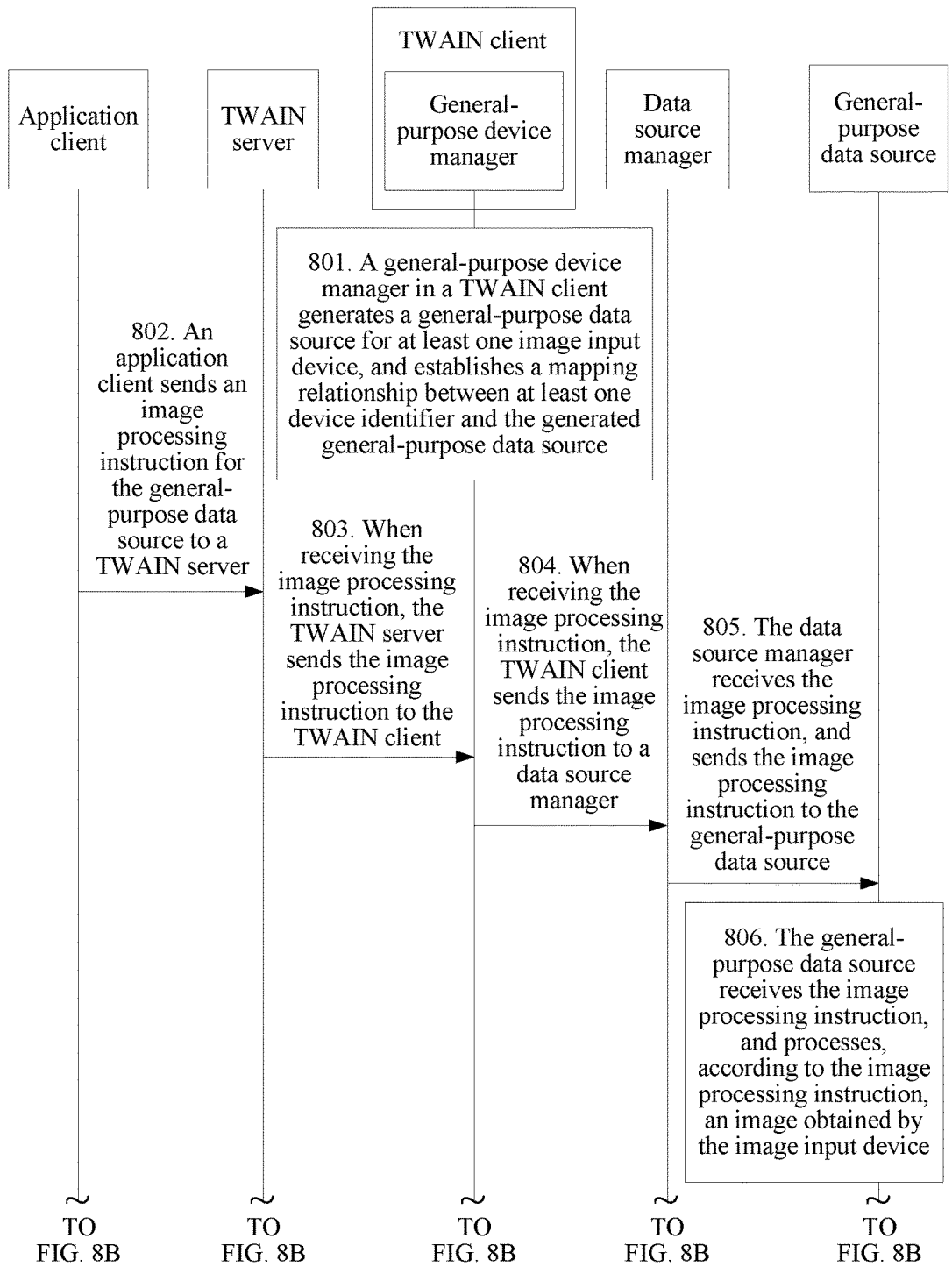
FIG. 8A and FIG. 8B are a flowchart of an image processing method according to an embodiment of the application.
Figure 8B:
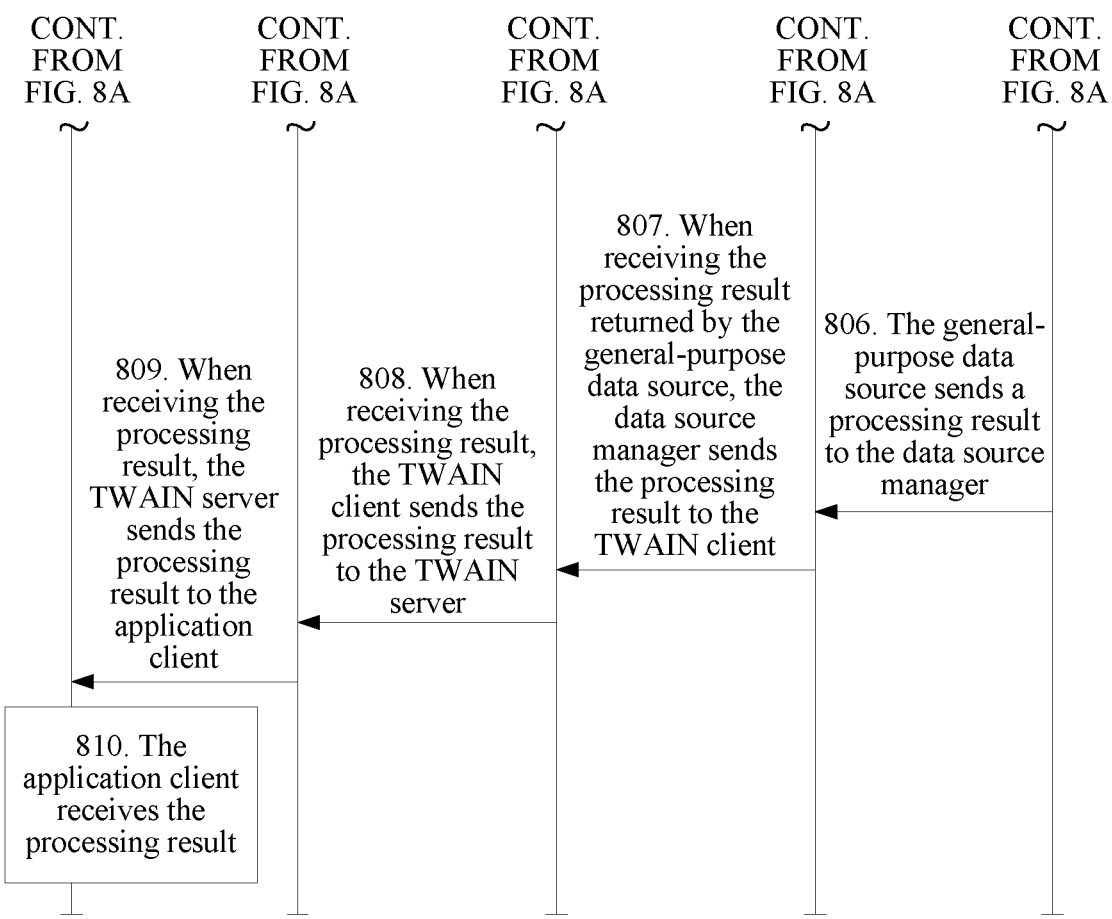

FIG. 8A and FIG. 8B are a flowchart of an image processing method according to an embodiment of the application. This embodiment of the application is applied to the image processing system shown in FIG. 3, and is executed by an application client, a TWAIN server, a general-purpose device manager, a general-purpose data source, and a data source manager. The data source manager and the general-purpose data source are external to the TWAIN client, and the general-purpose device manager is built in the TWAIN client. Referring to FIG. 8A and FIG. 8B, the method includes the following steps.

801. The general-purpose device manager in the TWAIN client generates a general-purpose data source for the at least one image input device, and establishes a mapping relationship between the at least one device identifier and the generated general-purpose data source.

A process of establishing the mapping relationship in step 801 is similar to that in step 701. Details are not described herein again.

It should be additionally noted that, during initialization of the TWAIN client, the general-purpose device manager is first initialized, and the general-purpose device manager performs step 801 to establish the mapping relationship. Then, the TWAIN client loads the data source manager, and starts the data source manager. After the initialization, the TWAIN client establishes a connection to the TWAIN server. A TWAIN redirection mapping process is completed.

802. The application client sends an image processing instruction for the general-purpose data source to the TWAIN server.

Optionally, in a remote virtual desktop system, when the application client needs to process an image obtained by an image input device configured in a terminal, the application client obtains an instruction parameter according to image information of a to-be-processed image, packs the instruction parameter according to a specified protocol to generate the image processing instruction, and sends the image processing instruction to the TWAIN server.

The instruction parameter includes an identifier of the application client, the image information of the to-be-processed image, and an image processing type. The image information is used to indicate which image is the to-be-processed image, and may be a name, a type, or the like of the image. The image processing type is used to indicate a type of an operation that is to be performed on the image. The operation may be a cropping operation, a color adjustment operation, a luminance adjustment operation, or the like. This is not limited in this embodiment of the application. In addition, the specified protocol may be the TWAIN protocol, or the like. This is not limited in this embodiment of the application.

The instruction parameter may further include an image parameter specified by a user. Further, the application client may display multiple image setting options on a provided display screen. When the user expects to process the image, the user may first perform setting using the multiple displayed image setting options, and the application client may obtain the image parameter specified by the user.

803. When receiving the image processing instruction, the TWAIN server sends the image processing instruction to the TWAIN client.

804. When receiving the image processing instruction, the TWAIN client sends the image processing instruction to the data source manager.

After receiving the image processing instruction, the TWAIN server sends the image processing instruction to the TWAIN client. When receiving the image processing instruction, the TWAIN client unpacks the image processing instruction to obtain the instruction parameter in the image processing instruction, and then sends the instruction parameter in the image processing instruction to the data source manager by invoking a first interface.

805. The data source manager receives the image processing instruction, and sends the image processing instruction to the general-purpose data source.

When receiving the instruction parameter in the image processing instruction, the data source manager obtains, according to the mapping relationship that is between the device identifier and the general-purpose data source and that is established by the general-purpose device manager, the general-purpose data source that corresponds to the image input device and that is built in the TWAIN client. Then, the data source manager sends the instruction parameter in the image processing instruction to the general-purpose data source by invoking a second interface.

806. The general-purpose data source receives the image processing instruction, processes, according to the image processing instruction, an image obtained by the image input device, and sends a processing result to the data source manager.

Step 806 is similar to step 704. Details are not described herein again.

In addition, if the image processing instruction includes the image parameter specified by the user, the general-purpose data source may process, according to the image parameter, the image obtained by the image input device in order to obtain an image that matches the image parameter.

807. When receiving the processing result returned by the general-purpose data source, the data source manager sends the processing result to the TWAIN client.

808. When receiving the processing result, the TWAIN client sends the processing result to the TWAIN server.

When receiving the processing result, the TWAIN client packs the processing result according to the specified protocol to obtain a processing result packet, and sends the processing result packet to the TWAIN server.

809. When receiving the processing result, the TWAIN server sends the processing result to the application client.

810. The application client receives the processing result.

When receiving the processing result packet, the TWAIN server unpacks the processing result packet to obtain the processing result, and sends the processing result to the application client. The application client receives the processing result.

It should be noted that, in this embodiment of the application, an example in which the data source manager is external to the TWAIN client is used merely for description. In an application embodiment, the data source manager may be built in the TWAIN client. This is not limited in this embodiment of the application.

Further, the data source manager in the terminal may be configured to manage a data source provided by the image input device and the general-purpose data source generated by the general-purpose device manager. Alternatively, the terminal may include two data source managers: a first data source manager and a second data source manager. The first data source manager is specially configured to manage the data source provided by the image input device, and the second data source manager is specially configured to manage the general-purpose data source generated by the general-purpose device manager. This is not limited in this embodiment of the application.

According to the method provided in this embodiment of the application, the general-purpose data source is introduced, and the general-purpose data source processes the image obtained by the image input device. When receiving the image processing instruction sent by the data source manager, the general-purpose data source processes, according to the image processing instruction, the image obtained by the image input device, and sends the processing result to the data source manager. In this way, a problem is avoided that the image obtained by the image input device cannot be processed because the image input device does not provide a data source, and flexibility is improved.

Figure 9A:
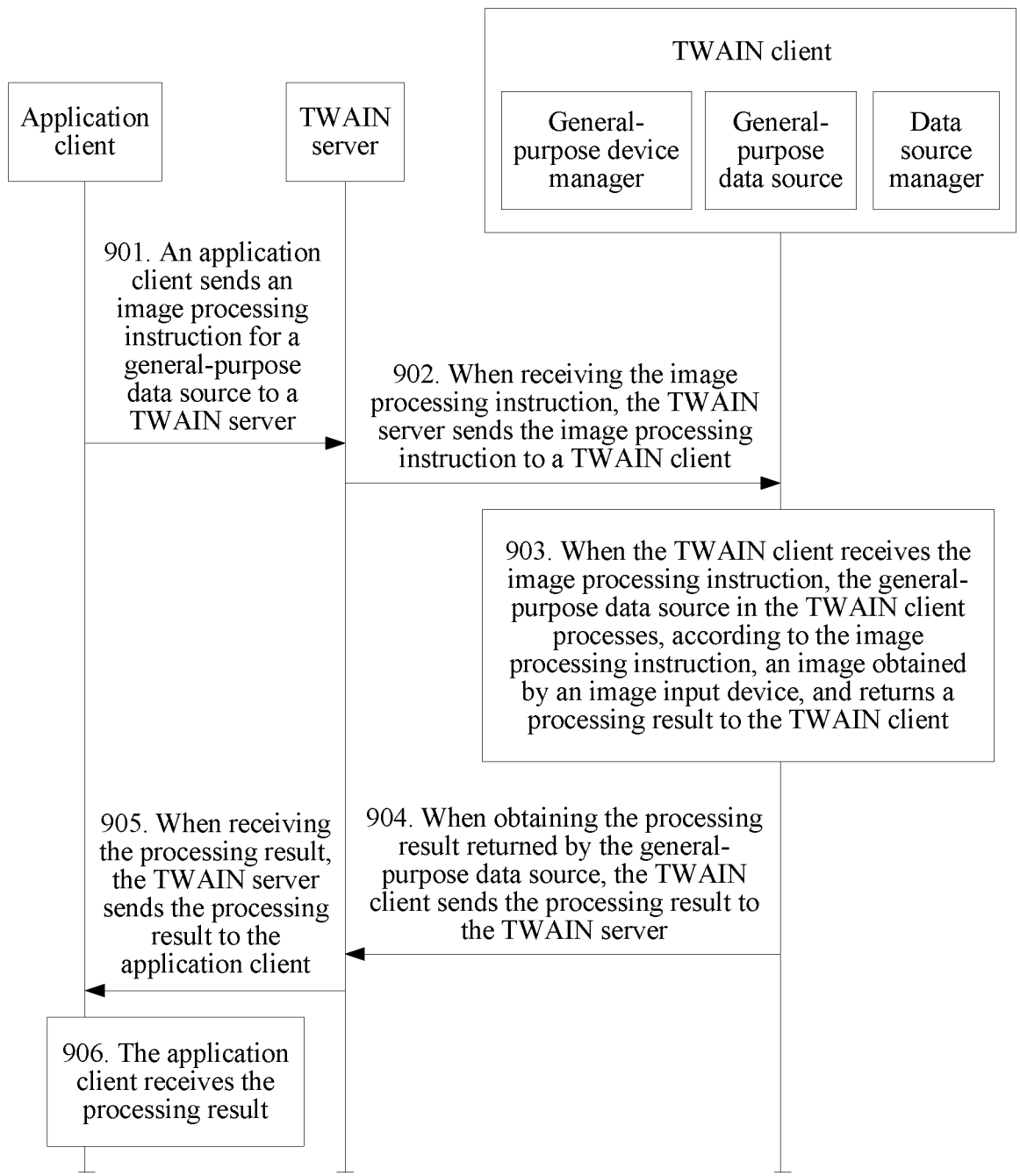
FIG. 9A is a flowchart of an image processing method according to an embodiment of the application.

FIG. 9A is a flowchart of an image processing method according to an embodiment of the application. This embodiment of the application is applied to the image processing system shown in FIG. 4, and is executed by an application client, a TWAIN server, a TWAIN client, a data source manager, a general-purpose device manager, and a general-purpose data source. In comparison with the image processing system shown in FIG. 3, the data source manager, the general-purpose device manager, and the general-purpose data source in the image processing system shown in FIG. 4 are built in the TWAIN client. Referring to FIG. 9A, the method includes the following steps.

901. The application client sends an image processing instruction for the general-purpose data source to the TWAIN server.

902. When receiving the image processing instruction, the TWAIN server sends the image processing instruction to the TWAIN client.

903. When the TWAIN client receives the image processing instruction, the general-purpose data source in the TWAIN client processes, according to the image processing instruction, an image obtained by the image input device, and returns a processing result to the TWAIN client.

When the data source manager is built in the TWAIN client, the TWAIN client may implement a function of the data source manager, that is, the TWAIN client may instantiate the general-purpose data source, and send an instruction to the general-purpose data source. The general-purpose data source performs processing according to the instruction.

904. When obtaining the processing result returned by the general-purpose data source, the TWAIN client sends the processing result to the TWAIN server.

905. When receiving the processing result, the TWAIN server sends the processing result to the application client.

906. The application client receives the processing result.

A specific process of this embodiment of the application is similar to a specific process of the embodiment shown in FIG. 7. Details are not described herein again.

Figures 1, 9B:
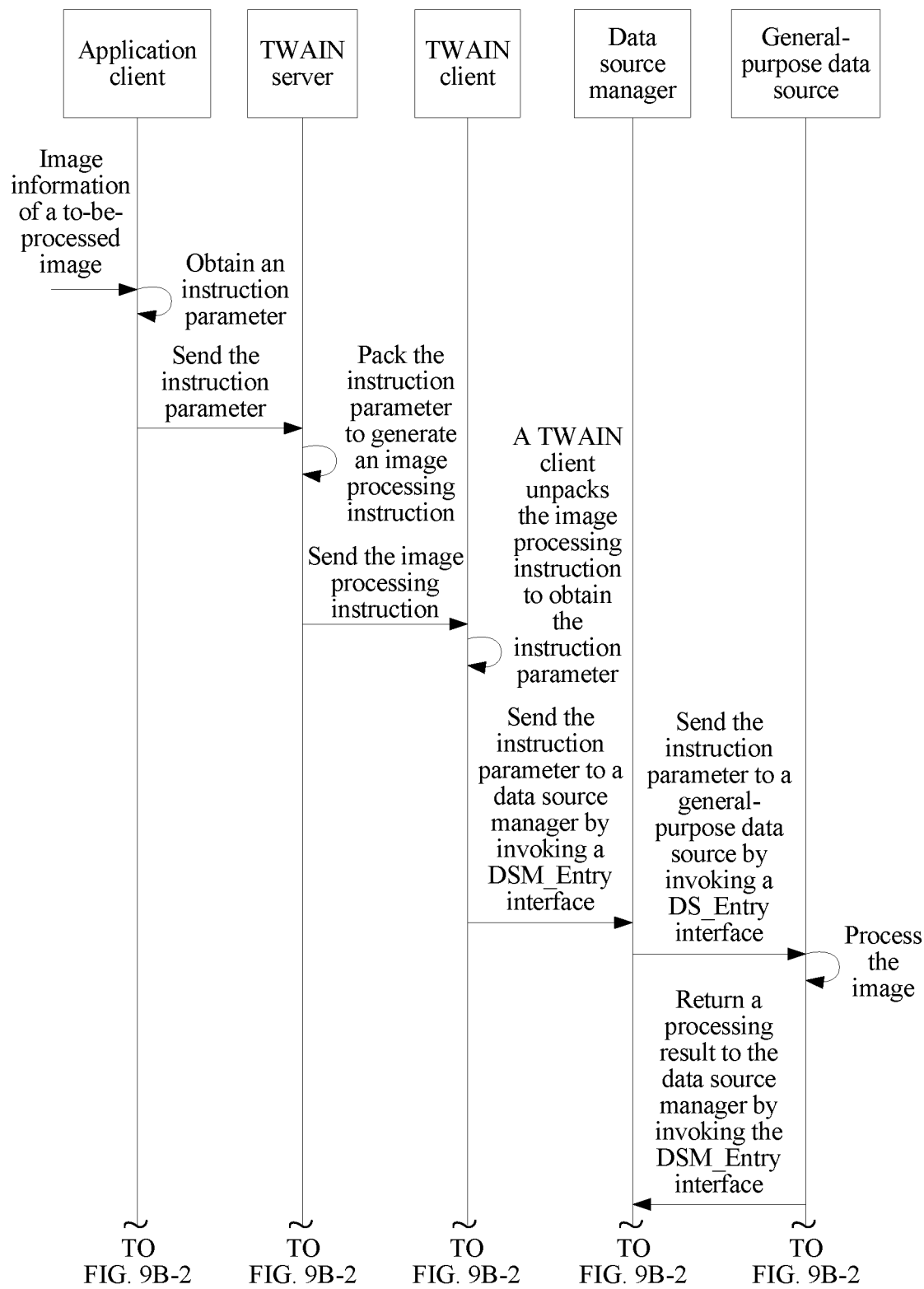
Figures 2, 9B:
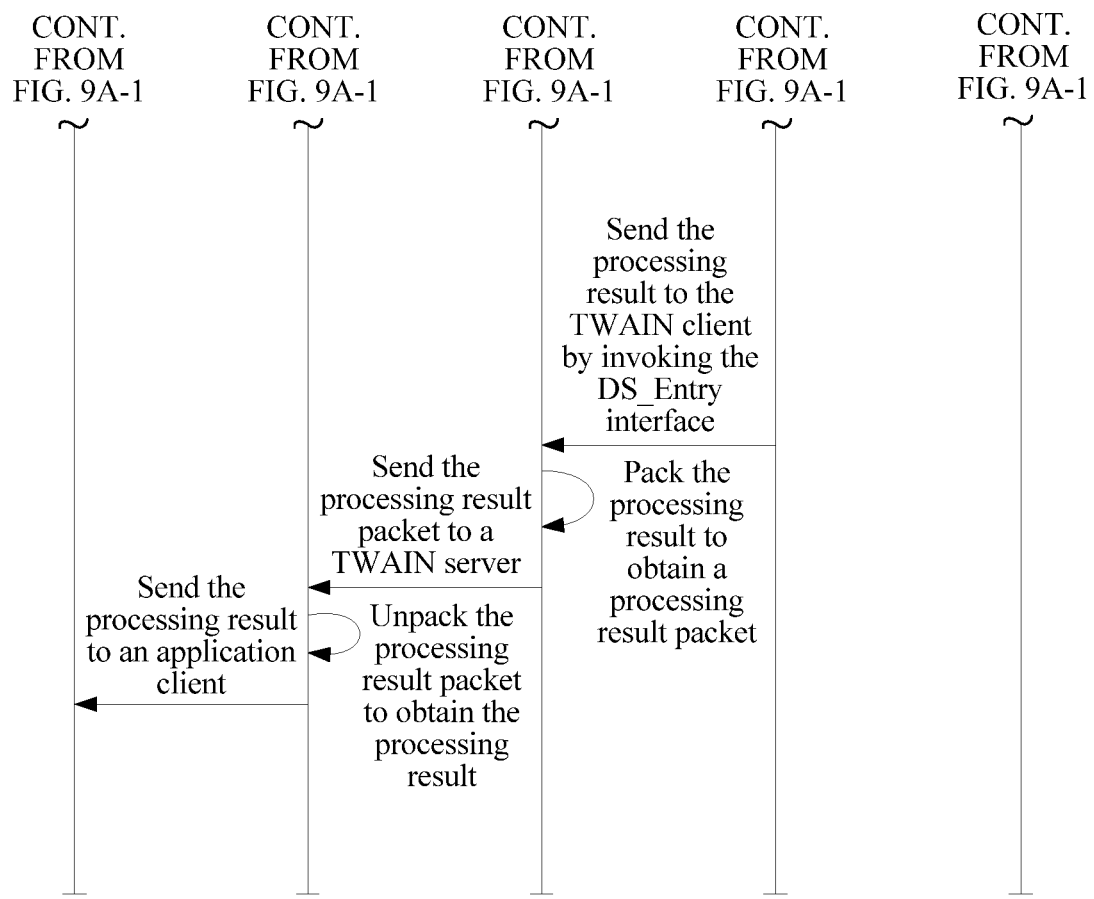

In an example in which a first interface is a DSM_Entry interface and a second interface is a DS_Entry interface, an operation procedure in which the application client processes the image obtained by the image input device may be shown in FIG. 9B-1 and FIG. 9B-2. Specific steps are as follows.

(1) The application client obtains an instruction parameter according to image information of a to-be-processed image, and sends the instruction parameter to the TWAIN server.

(2) When receiving the instruction parameter, the TWAIN server packs the instruction parameter to generate an image processing instruction, and sends the image processing instruction to the TWAIN client.

(3) When receiving the image processing instruction, the TWAIN client unpacks the image processing instruction to obtain the instruction parameter in the image processing instruction.

(4) The TWAIN client sends the instruction parameter to the data source manager by invoking a DSM_Entry interface, and the data source manager sends the instruction parameter to the general-purpose data source by invoking a DS_Entry interface.

(5) When receiving the instruction parameter, the general-purpose data source processes an image obtained by the image input device, and returns a processing result to the data source manager by invoking the DSM_Entry interface; and the data source manager sends the processing result to the TWAIN client by invoking the DS_Entry interface.

(6) When receiving the processing result, the TWAIN client packs the processing result to obtain a processing result packet, and sends the processing result packet to the TWAIN server.

(7) When receiving the processing result packet, the TWAIN server unpacks the processing result packet to obtain the processing result, and sends the processing result to the application client; and the application client receives the processing result.

According to the method provided in this embodiment of the application, the general-purpose data source is introduced, and the general-purpose data source processes the image obtained by the image input device. When receiving the image processing instruction sent by the data source manager, the general-purpose data source processes, according to the image processing instruction, the image obtained by the image input device, and sends the processing result to the data source manager. In this way, a problem is avoided that the image obtained by the image input device cannot be processed because the image input device does not provide a data source, and flexibility is improved.

Figure 10A:
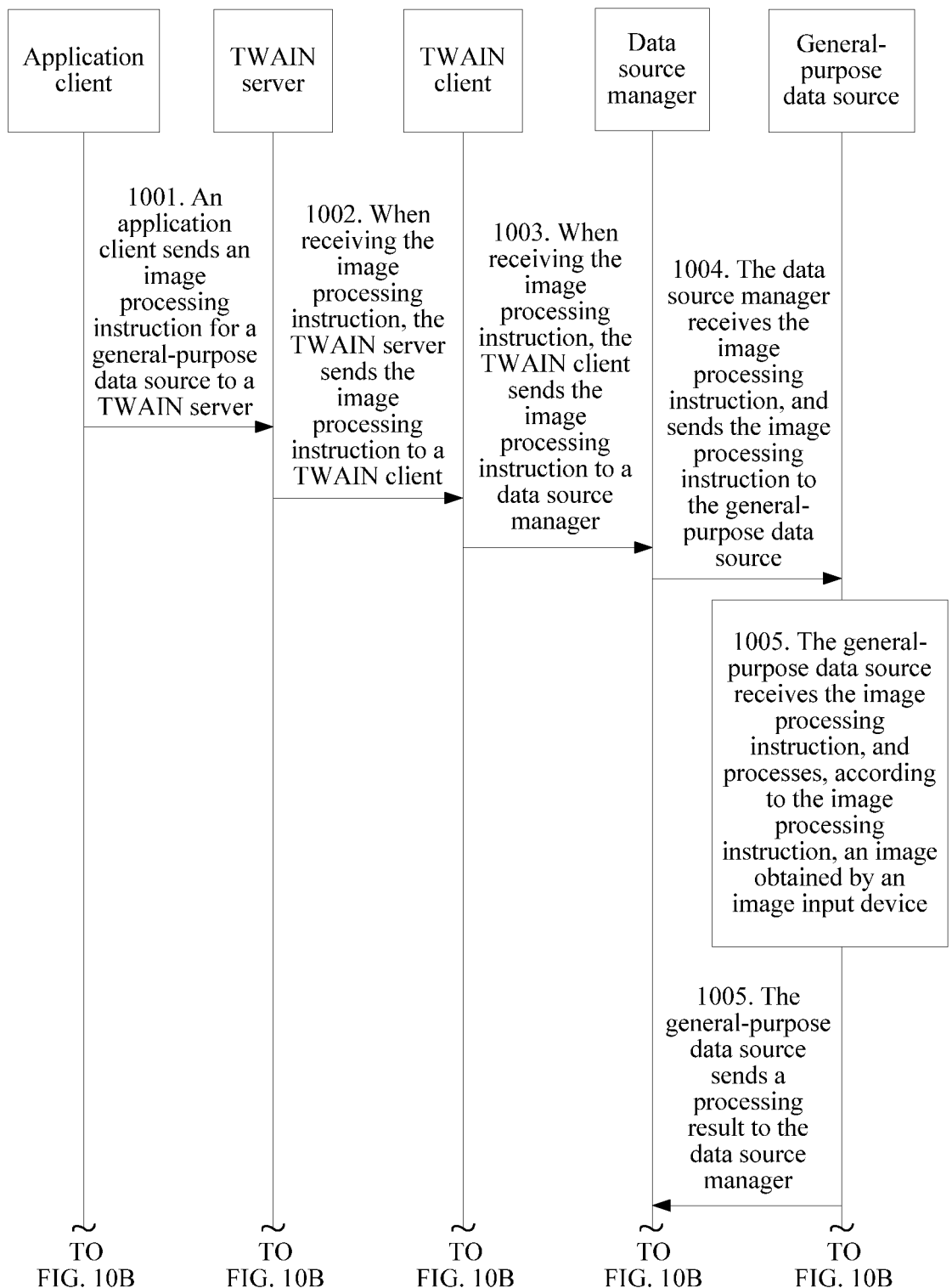
FIG. 10A and FIG. 10B are a flowchart of an image processing method according to an embodiment of the application.
Figure 10B:
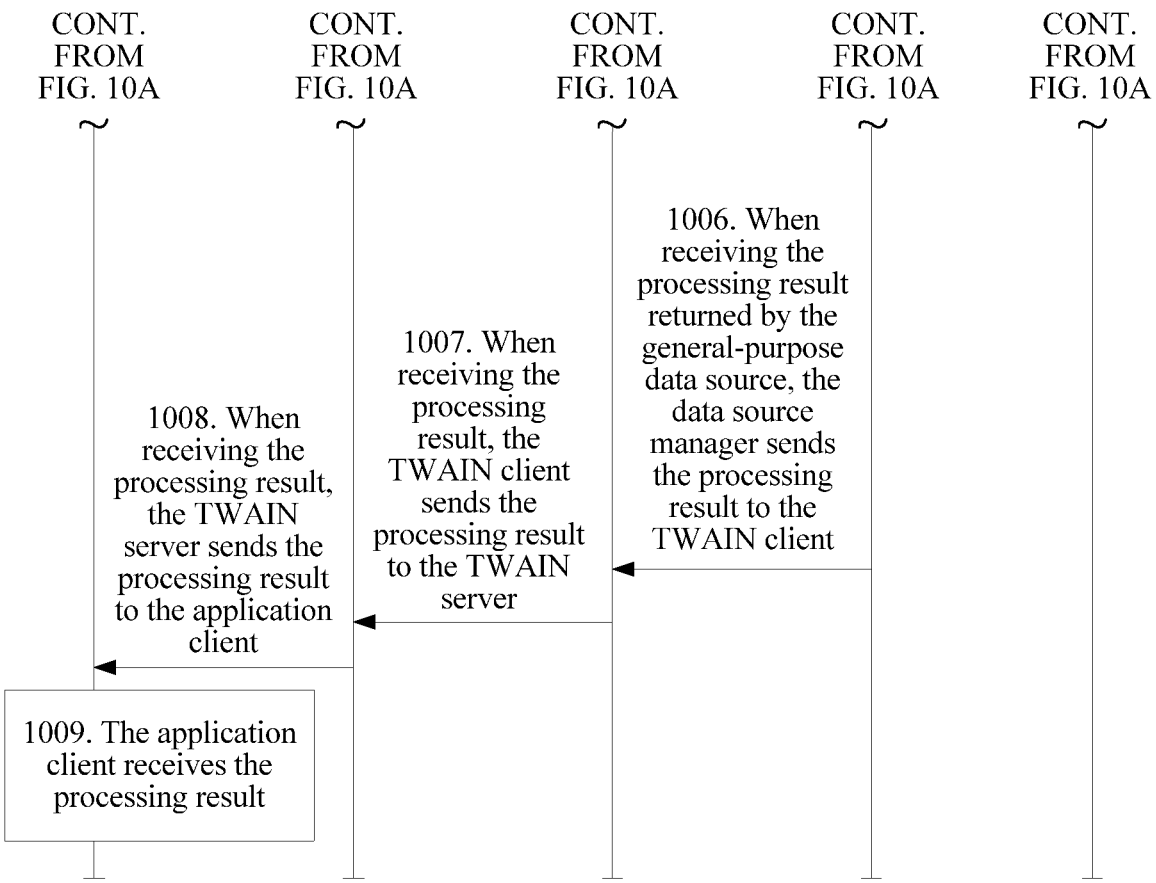

FIG. 10A and FIG. 10B are a flowchart of an image processing method according to an embodiment of the application. This embodiment of the application is applied to the image processing system shown in FIG. 5, and is executed by an application client, a TWAIN server, a TWAIN client, a data source manager, a general-purpose device manager, and a general-purpose data source. In comparison with the image processing system shown in FIG. 3, the data source manager, the general-purpose device manager, and the general-purpose data source in the image processing system shown in FIG. 5 are all external to the TWAIN client. Referring to FIG. 10A and FIG. 10B, the method includes the following steps.

1001. The application client sends an image processing instruction for the general-purpose data source to the TWAIN server.

1002. When receiving the image processing instruction, the TWAIN server sends the image processing instruction to the TWAIN client.

1003. When receiving the image processing instruction, the TWAIN client sends the image processing instruction to the data source manager.

1004. The data source manager receives the image processing instruction, and sends the image processing instruction to the general-purpose data source.

1005. The general-purpose data source receives the image processing instruction, processes, according to the image processing instruction, an image obtained by the image input device, and sends a processing result to the data source manager.

1006. When receiving the processing result returned by the general-purpose data source, the data source manager sends the processing result to the TWAIN client.

1007. When receiving the processing result, the TWAIN client sends the processing result to the TWAIN server.

1008. When receiving the processing result, the TWAIN server sends the processing result to the application client.

1009. The application client receives the processing result.

A specific process of this embodiment of the application is similar to a specific process of the embodiment shown in FIG. 7. Details are not described herein again.

According to the method provided in this embodiment of the application, the general-purpose data source is introduced, and the general-purpose data source processes the image obtained by the image input device. When receiving the image processing instruction sent by the data source manager, the general-purpose data source processes, according to the image processing instruction, the image obtained by the image input device, and sends the processing result to the data source manager. In this way, a problem is avoided that the image obtained by the image input device cannot be processed because the image input device does not provide a data source, and flexibility is improved.

In another embodiment provided in the embodiments of the application, the image processing method provided in steps 1001 to 1009 may be further applied to the image processing system shown in FIG. 6. In comparison with the image processing system shown in FIG. 5, in the image processing system shown in FIG. 6, the general-purpose data source is external to the TWAIN client, and the data source manager and the general-purpose device manager are built in the TWAIN client. A specific process is not described herein.

Figure 11:
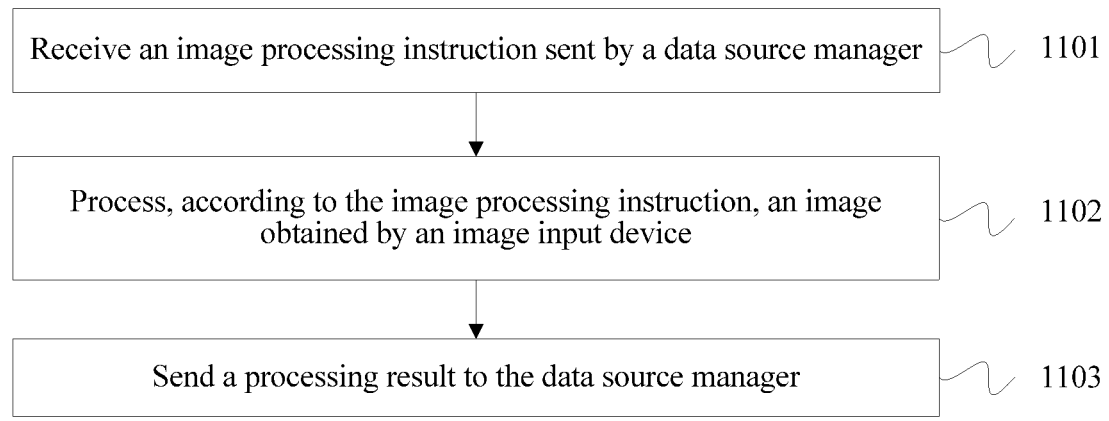
FIG. 11 is a flowchart of an image processing method according to an embodiment of the application.

FIG. 11 is a flowchart of an image processing method according to an embodiment of the application. This embodiment of the application is executed by a general-purpose data source. Referring to FIG. 11, the method includes the following steps.

1101. Receive an image processing instruction sent by a data source manager, where the image processing instruction is triggered by an application client, and the image processing instruction is used to instruct to process an image that is obtained by an image input device corresponding to the general-purpose data source.

1102. Process, according to the image processing instruction, the image obtained by the image input device.

1103. Send a processing result to the data source manager.

According to the method provided in this embodiment of the application, the general-purpose data source is introduced, and the general-purpose data source processes the image obtained by the image input device. When receiving the image processing instruction sent by the data source manager, the general-purpose data source processes, according to the image processing instruction, the image obtained by the image input device, and sends the processing result to the data source manager. In this way, a problem is avoided that the image obtained by the image input device cannot be processed because the image input device does not provide a data source, and flexibility is improved.

In a first possible implementation, the general-purpose data source is generated by a general-purpose device manager, and the processing, according to the image processing instruction, the image obtained by the image input device includes sending a query request to the general-purpose device manager such that the general-purpose device manager queries, according to an established mapping relationship between the general-purpose data source and a device identifier of the image input device, the device identifier of the image input device corresponding to the general-purpose data source, and returns the device identifier; receiving the device identifier returned by the general-purpose device manager; and processing the image that is obtained by the image input device corresponding to the device identifier.

In a second possible implementation, the processing, according to the image processing instruction, the image obtained by the image input device includes determining, according to the image processing instruction, a specified device identifier from a device identifier of the at least one image input device; and processing an image that is obtained by an image input device indicated by the specified device identifier.

In a third possible implementation, the method further includes, when a first device identifier in the device identifier of the at least one image input device is the specified device identifier, receiving an instruction of switching an image input device; and determining, as the specified device identifier, a second device identifier that is indicated by the instruction of switching an image input device.

All the foregoing optional technical solutions may be randomly combined to obtain optional embodiments of the application. Details are not described herein.

Figure 12:
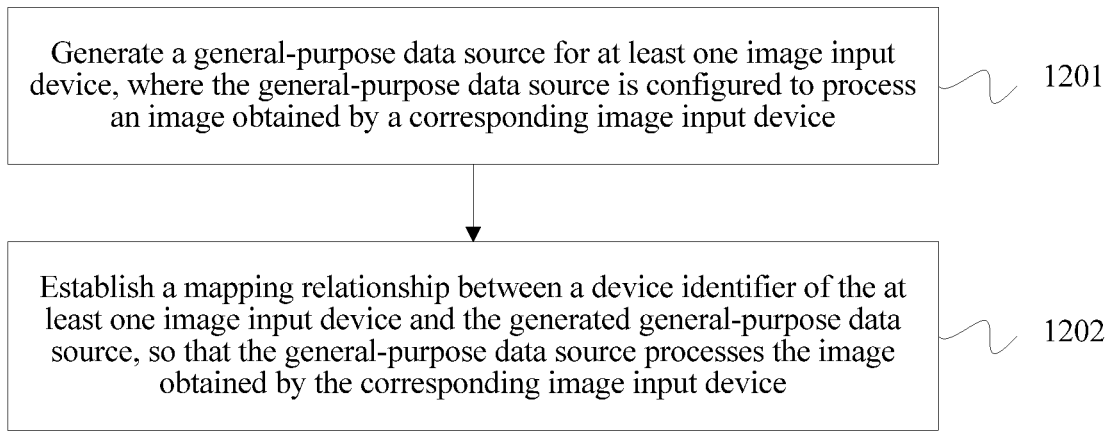
FIG. 12 is a flowchart of an image processing method according to an embodiment of the application.

FIG. 12 is a flowchart of an image processing method according to an embodiment of the application. This embodiment of the application is executed by a general-purpose device manager. Referring to FIG. 12, the method includes the following steps.

1201. Generate a general-purpose data source for the at least one image input device, where the general-purpose data source is configured to process an image obtained by a corresponding image input device.

1202. Establish a mapping relationship between a device identifier of the at least one image input device and the generated general-purpose data source such that the general-purpose data source processes the image obtained by the corresponding image input device.

According to the method provided in this embodiment of the application, the general-purpose device manager is introduced. The general-purpose device manager generates the general-purpose data source for the image input device, and the general-purpose data source processes the image obtained by the image input device. When receiving an image processing instruction sent by a data source manager, the general-purpose data source processes, according to the image processing instruction, the image obtained by the image input device, and sends a processing result to the data source manager. In this way, a problem is avoided that the image obtained by the image input device cannot be processed because the image input device does not provide a data source, and flexibility is improved.

In a first possible implementation, the method further includes generating one general-purpose data source for each of the at least one image input device; and establishing a mapping relationship between a device identifier of each image input device and a general-purpose data source generated for the corresponding image input device.

In a second possible implementation, the method further includes receiving a query request sent by a specified general-purpose data source; querying, according to an established mapping relationship, at least one device identifier corresponding to the specified general-purpose data source; and sending a found device identifier to the specified general-purpose data source.

All the foregoing optional technical solutions may be randomly combined to obtain optional embodiments of the application. Details are not described herein.

Figure 13:
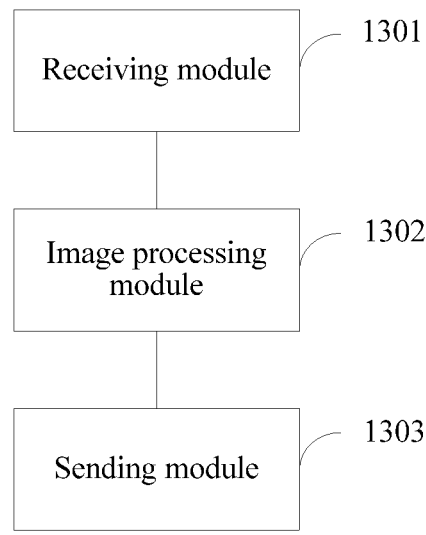
FIG. 13 is a schematic structural diagram of an image processing apparatus according to an embodiment of the application.

FIG. 13 is a schematic structural diagram of a general-purpose data source according to an embodiment of the application. Referring to FIG. 13, the general-purpose data source includes a receiving module 1301 configured to receive an image processing instruction sent by a data source manager, where the image processing instruction is triggered by an application client, and the image processing instruction is used to instruct to process an image that is obtained by an image input device corresponding to the general-purpose data source; an image processing module 1302 configured to process, according to the image processing instruction, the image obtained by the image input device; and a sending module 1303 configured to send a processing result to the data source manager.

According to the general-purpose data source provided in this embodiment of the application, the image obtained by the image input device is processed. When receiving the image processing instruction sent by the data source manager, the general-purpose data source processes, according to the image processing instruction, the image obtained by the image input device, and sends the processing result to the data source manager. In this way, a problem is avoided that the image obtained by the image input device cannot be processed because the image input device does not provide a data source, and flexibility is improved.

In a first possible implementation, the general-purpose data source is generated by a general-purpose device manager.

The sending module 1303 is further configured to send a query request to the general-purpose device manager such that the general-purpose device manager queries, according to an established mapping relationship between the general-purpose data source and a device identifier of the image input device, the device identifier of the image input device corresponding to the general-purpose data source, and returns the device identifier.

The receiving module 1301 is further configured to receive the device identifier returned by the general-purpose device manager.

The image processing module 1302 is further configured to process the image that is obtained by the image input device corresponding to the device identifier.

In a second possible implementation, the image processing module 1302 is further configured to determine a specified device identifier from a device identifier of the at least one image input device according to the image processing instruction; and process an image that is obtained by an image input device indicated by the specified device identifier.

In a third possible implementation, the general-purpose data source further includes a determining module.

The receiving module 1301 is further configured to, when a first device identifier in the device identifier of the at least one image input device is the specified device identifier, receive an instruction of switching an image input device.

The determining module is configured to determine, as the specified device identifier, a second device identifier that is indicated by the instruction of switching an image input device.

All the foregoing optional technical solutions may be randomly combined to obtain optional embodiments of the application. Details are not described herein.

Figure 14:
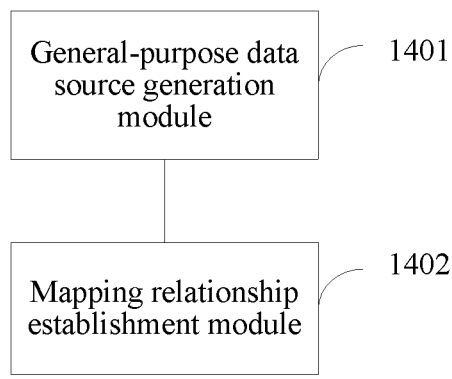
FIG. 14 is a schematic structural diagram of an image processing apparatus according to an embodiment of the application.

FIG. 14 is a schematic structural diagram of a general-purpose device manager according to an embodiment of the application. Referring to FIG. 14, the general-purpose device manager includes a general-purpose data source generation module 1401 configured to generate a general-purpose data source for at least one image input device, where the general-purpose data source is configured to process an image obtained by a corresponding image input device; and a mapping relationship establishment module 1402 configured to establish a mapping relationship between a device identifier of the at least one image input device and the generated general-purpose data source such that the general-purpose data source processes the image obtained by the corresponding image input device.

According to the apparatus provided in this embodiment of the application, the general-purpose device manager is introduced. The general-purpose device manager generates the general-purpose data source for the image input device, and the general-purpose data source processes the image obtained by the image input device. When receiving an image processing instruction sent by a data source manager, the general-purpose data source processes, according to the image processing instruction, the image obtained by the image input device, and sends a processing result to the data source manager. In this way, a problem is avoided that the image obtained by the image input device cannot be processed because the image input device does not provide a data source, and flexibility is improved.

In a first possible implementation, the general-purpose data source generation module 1401 is further configured to generate one general-purpose data source for each of the at least one image input device.

The mapping relationship establishment module 1402 is further configured to establish a mapping relationship between a device identifier of each image input device and a general-purpose data source generated for the corresponding image input device.

In a second possible implementation, the apparatus further includes a receiving module configured to receive a query request sent by a specified general-purpose data source; a querying module configured to query, according to an established mapping relationship, at least one device identifier corresponding to the specified general-purpose data source; and a sending module configured to send a found device identifier to the specified general-purpose data source.

All the foregoing optional technical solutions may be randomly combined to obtain optional embodiments of the application. Details are not described herein.

It should be noted that, during image processing performed by the image processing apparatus provided in the foregoing embodiment, description is given only using division of the foregoing function modules. In an application embodiment, the functions may be allocated to different function modules for implementation according to a requirement. That is, internal structures of the data source manager, the general-purpose device manager, and the general-purpose data source are divided into different function modules to implement all or some of the functions described above. In addition, the image processing apparatus provided in the foregoing embodiment pertains to a same concept as the image processing method embodiment. For a specific implementation process of the image processing apparatus, refer to the method embodiment. Details are not described herein again.

Figure 15:
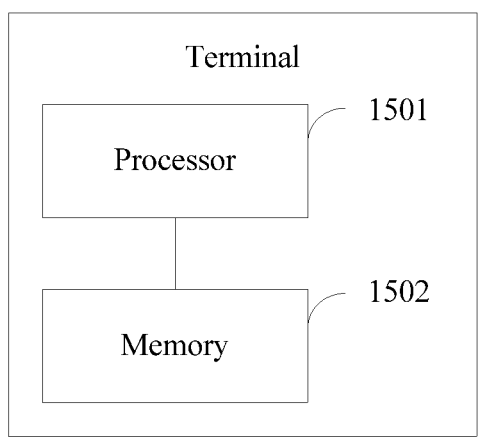
FIG. 15 is a schematic structural diagram of a terminal according to an embodiment of the application.

FIG. 15 is a possible schematic structural diagram of the foregoing terminal according to an embodiment of the application. Referring to FIG. 15, the terminal includes a processor 1501 and a memory 1502, and the processor 1501 is connected to the memory 1502 using a bus.

The memory 1502 is configured to store a computer-executable instruction. When the terminal runs, the processor 1501 executes the computer-executable instruction stored in the memory 1502, to implement a general-purpose data source such that the general-purpose data source performs the image processing method in the foregoing embodiments.

It should be noted that, to meet a specific implementation requirement, another interface (such as a network interface or a general-purpose 10 interface) may be additionally provided in the terminal, and a drive program corresponding to the interface is stored in the memory 1502. For example, a driver of the image input device is installed in the terminal, and the terminal has an interface that matches the image input device, and is externally connected to the image input device in a matched manner using the interface.

Figure 16:
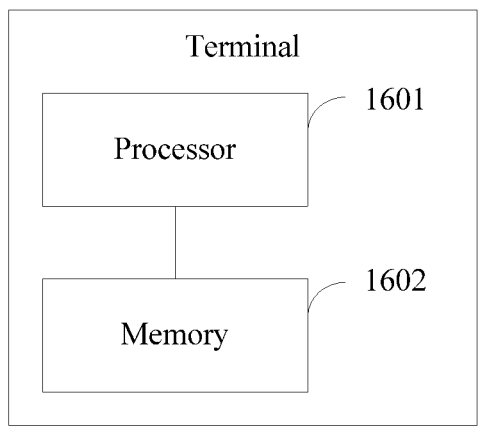
FIG. 16 is a schematic structural diagram of a terminal according to an embodiment of the application.

FIG. 16 is an optional schematic structural diagram of the foregoing terminal according to an embodiment of the application. Referring to FIG. 16, the terminal includes a processor 1601 and a memory 1602, and the processor 1601 is connected to the memory 1602 using a bus.

The memory 1602 is configured to store a computer-executable instruction. When the terminal runs, the processor 1601 executes the computer-executable instruction stored in the memory 1602, to implement a general-purpose device manager such that the general-purpose device manager performs the image processing method in the foregoing embodiments.

It should be noted that, to meet a specific implementation requirement, another interface (such as a network interface or a general-purpose input/output (IO) interface) may be additionally provided in the terminal, and a drive program corresponding to the interface is stored in the memory 1602. For example, a driver of the image input device is installed in the terminal, and the terminal has an interface that matches the image input device, and is externally connected to the image input device in a matched manner using the interface.

A person of ordinary skill in the art may understand that all or some of the steps of the embodiments may be implemented using hardware or a program instructing related hardware. The program may be stored in a computer-readable storage medium. The storage medium mentioned above may be a read-only memory, a magnetic disk, an optical disc, or the like.

The foregoing descriptions are merely examples of embodiments of the application, but are not intended to limit the application. Any modification, equivalent replacement, and improvement made without departing from the spirit and principle of the application shall fall within the protection scope of the application.

What is claimed is:

1. An image processing system implemented in hardware, comprising:
    a first general-purpose data source configured to retrieve images directly from a plurality of different image input devices without data sources of the plurality of different image input devices;
    a first image input device corresponding to the first general-purpose data source;
    a data source manager coupled to the first general-purpose data source;
    an application client coupled to the data source manager and configured to send a first image processing instruction to the data source manager, the image processing instruction identifying the first image input device,
    wherein the data source manager is configured to send the first image processing instruction to the first general-purpose data source,
    wherein the first general-purpose data source is configured to:
        process, according to the first image processing instruction, a first image obtained by the first image input device; and
        send a first processing result to the data source manager, and
    wherein the data source manager is further configured to send the first processing result to the application client.

2. The system of claim 1, wherein the first general-purpose data source is further configured to determine, according to the first image processing instruction, a specified device identifier from a device identifier of the first image input device.

3. The system of claim 1, further comprising a general-purpose device manager configured to:
    obtain a first device identifier of the first image input device;
    generate the first general-purpose data source according to the first device identifier; and
    establish a first mapping relationship between the first device identifier and the first general-purpose data source.

4. The system of claim 3, further comprising a terminal and a server, wherein the application client is located on the server, wherein the data source manager, the general-purpose device manager, and the first general-purpose data source are located in the terminal, wherein a TWAIN server is installed on the server, wherein a TWAIN client is installed in the terminal and in communication with the TWAIN server, and wherein the data source manager, the general-purpose device manager, and the first general-purpose data source are external to the TWAIN client.

5. The system of claim 3, further comprising a terminal and a server, wherein the application client is located on the server, wherein the data source manager and the first general-purpose data source are located in the terminal, wherein a TWAIN server is installed on the server, wherein a TWAIN client is installed in the terminal and in communication with the TWAIN server, wherein the data source manager and the first general-purpose data source are external to the TWAIN client, and wherein the general-purpose device manager is built in the TWAIN client.

6. The system of claim 3, further comprising a terminal and a server, wherein the application client is located on the server, wherein a TWAIN server is installed on the server, wherein a TWAIN client is installed in the terminal and in communication with the TWAIN server, and wherein the data source manager, the general-purpose device manager, and the first general-purpose data source are built in the TWAIN client.

7. The system of claim 3, further comprising a terminal and a server, wherein the application client is located on the server, wherein a TWAIN server is installed on the server, wherein a TWAIN client is installed in the terminal and in communication with the TWAIN server, wherein the first general-purpose data source is external to the TWAIN client, and wherein the data source manager and the general-purpose device manager are built in the TWAIN client.

8. An image processing method executed by a general-purpose data source configured to retrieve images directly from a plurality of different image input devices without data sources of the plurality of different image input devices, the method comprising:
 receiving an image processing instruction from a data source manager, the image processing instruction being triggered by an application client, and the image processing instruction instructing to process an image obtained by an image input device corresponding to the general-purpose data source;
 processing, according to the image processing instruction, the image obtained by the image input device; and
 sending a processing result to the data source manager.

9. The method of claim 8, wherein the general-purpose data source is generated by a general-purpose device manager, and processing the image obtained by the image input device comprises:
 sending a query request to the general-purpose device manager, the query request indicating the general-purpose device manager to query, according to an established mapping relationship between the general-purpose data source and a device identifier of the image input device, the device identifier of the image input device corresponding to the general-purpose data source, and return the device identifier;
 receiving the device identifier returned by the general-purpose device manager; and
 processing the image obtained by the image input device corresponding to the device identifier.

10. The method of claim 8, wherein processing the image obtained by the image input device comprises:
 determining, according to the image processing instruction, a specified device identifier from a device identifier of the at least one image input device; and
 processing an image obtained by an image input device indicated by the specified device identifier.

11. The method of claim 10, further comprising:
 receiving an instruction of switching an image input device when a first device identifier in the device identifier of the at least one image input device is the specified device identifier; and
 determining, as the specified device identifier, a second device identifier indicated by the instruction of switching an image input device.

12. A terminal, comprising:
 a memory configured to store computer-executable instructions; and
 a processor coupled to the memory and configured to execute the instructions stored in the memory in order to generate a general-purpose data source configured to:
  retrieve images directly from a plurality of different image input devices without data sources of the plurality of different image input devices;
  receive an image processing instruction from a data source manager, the image processing instruction being triggered by an application client, and the image processing instruction instructing to process an image obtained by an image input device corresponding to the general-purpose data source;
  process, according to the image processing instruction, the image obtained by the image input device; and
  send a processing result to the data source manager.

13. The terminal of claim 12, wherein the general-purpose data source is generated by a general-purpose device manager implemented by the instructions, and the instructions configure the general-purpose data source to:
 send a query request to the general-purpose device manager;
 receive a device identifier of the image input device from the general-purpose device manager; and
 process the image obtained by the image input device corresponding to the device identifier.

14. The terminal of claim 12, wherein the instructions configure the general-purpose data source to:
 determine, according to the image processing instruction, a specified device identifier from a device identifier of at least one image input device; and
 process an image obtained by an image input device indicated by the specified device identifier.

15. The terminal of claim 14, wherein the instructions configure the general-purpose data source to:
 receive an instruction of switching an image input device when a first device identifier in the device identifier of the at least one image input device is the specified device identifier; and
 determine, as the specified device identifier, a second device identifier indicated by the instruction of switching an image input device.

16. The system of claim 1, wherein the application client is further configured to send a second image processing instruction to the data source manager, the image processing instruction identifying a second image input device,
 wherein the data source manager is further configured to send the second image processing instruction to the general-purpose data source,
 wherein the general-purpose data source is further configured to:
  process, according to the second image processing instruction, a second image obtained by the second image input device; and
  send a second processing result to the data source manager, and
 wherein the data source manager is further configured to send the second processing result to the application client.

17. The system of claim 16, further comprising a general-purpose device manager configured to:
 obtain a first device identifier of the first image input device;
 obtain a second device identifier of the second image input device;
 generate the first general-purpose data source according to the first device identifier and the second device identifier;
 establish a first mapping relationship between the first device identifier and the first general-purpose data source; and establish a second mapping relationship between the second device identifier and the first general-purpose data source.

18. The system of claim 3, wherein the general-purpose device manager is further configured to:
obtain a second device identifier of a second image input device;
generate a second general-purpose data source according to the second device identifier; and
establish a mapping relationship between the second device identifier and the second general-purpose data source.

19. The system of claim 17, wherein the second general-purpose data source is a copy of the first general-purpose data source.

20. The system of claim 1, wherein the first general-purpose data source is configured to retrieve images directly from the plurality of different image input devices without additional drivers.

* * * * *